(12) United States Patent
Le Leannec et al.

(10) Patent No.: US 11,595,685 B2
(45) Date of Patent: Feb. 28, 2023

(54) MOTION VECTOR PREDICTION IN VIDEO ENCODING AND DECODING

(71) Applicant: InterDigital VC Holdings, Inc., Wilmington, DE (US)

(72) Inventors: Fabrice Le Leannec, Mouaze (FR); Franck Galpin, Thorigne-Fouillard (FR); Tangi Poirier, Thorigne-Fouillard (FR); Philippe Bordes, Laille (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/277,199

(22) PCT Filed: Sep. 20, 2019

(86) PCT No.: PCT/US2019/052052
§ 371 (c)(1),
(2) Date: Mar. 17, 2021

(87) PCT Pub. No.: WO2020/061395
PCT Pub. Date: Mar. 26, 2020

(65) Prior Publication Data
US 2022/0030268 A1    Jan. 27, 2022

(30) Foreign Application Priority Data

Sep. 21, 2018   (EP) .................................... 18306229
Sep. 28, 2018   (EP) .................................... 18306276
(Continued)

(51) Int. Cl.
*H04N 19/55*    (2014.01)
*H04N 19/176*   (2014.01)

(52) U.S. Cl.
CPC ........... *H04N 19/55* (2014.11); *H04N 19/176* (2014.11)

(58) Field of Classification Search
None
See application file for complete search history.

(56) References Cited

U.S. PATENT DOCUMENTS

2005/0058201 A1* 3/2005 Fernandes ............ H04N 19/112
                                                  375/240.2
2010/0135395 A1* 6/2010 Servais ................ H04N 19/156
                                                  375/E7.123
(Continued)

OTHER PUBLICATIONS

Le Leannec, F., et al., "CE4 related: simplified non-sub-block STMVP", JVET of ITU-T SG 16 WP 3 and ISO/IEC JTC 1/SC 29/WG 11, 12th Meeting: Macao, CN, Oct. 3-12, 2018, Document: JVET-L0207-v1, 6 pages.
(Continued)

*Primary Examiner* — Mohammad J Rahman
(74) *Attorney, Agent, or Firm* — Condo Roccia Koptiw LLP

(57) ABSTRACT

In general, encoding or decoding a picture part can involve determining a spatiotemporal motion vector predictor (STMVP) candidate for a merge mode of operation from spatial motion vector candidates taken from spatial positions around a current coding unit (CU) and a temporal motion vector candidate, where at least one embodiment involves determining the STMVP candidate based on considering at most two spatial positions and based on an average of at least two of the spatial and temporal motion vector candidates.

20 Claims, 22 Drawing Sheets

(30) Foreign Application Priority Data

Oct. 2, 2018 (EP) .................................... 18306292
Dec. 6, 2018 (EP) .................................... 18306635
Mar. 1, 2019 (EP) .................................... 19305239

(56) References Cited

U.S. PATENT DOCUMENTS

| | | | |
|---|---|---|---|
| 2018/0295380 A1* | 10/2018 | Chiu | H04N 19/55 |
| 2019/0387251 A1* | 12/2019 | Lin | H04N 19/105 |
| 2019/0394483 A1* | 12/2019 | Zhou | H04N 19/137 |
| 2020/0014931 A1* | 1/2020 | Hsiao | H04N 19/517 |
| 2020/0077116 A1* | 3/2020 | Lee | H04N 19/56 |
| 2020/0099941 A1* | 3/2020 | Li | H04N 19/103 |
| 2020/0107016 A1* | 4/2020 | Li | H04N 19/157 |
| 2020/0404256 A1* | 12/2020 | Zhang | H04N 19/176 |

OTHER PUBLICATIONS

Le Leannec, F., et al., "Simplification of CE4.2.2", JVET of ITU-T SG 16 WP 3 and ISO/IEC JTC 1/SC 29/WG 11, Document: JVET-M0713-r0, 4 pages.

Zhou, TianYang, et al., "Spatial-temporal merge mode (non sub-block STMVP)", JVET of ITU-T SG 16 WP 3 and ISO/IEC JTC 1/SC 29/WG 11, 11th Meeting: Ljubljana, SI, Jul. 10-18, 2018, Document: JVET-K0532_r2, 4 pages.

Le Leannec, F., et al., "CE4: STMVP without scaling (test 4.2.2)" JVET of ITU-T SG 16 WP 3 and ISO/IEC JTC 1/SC 29/WG 11, 13th Meeting : Marrakech, MA, Jan. 9-18, 2019, Document: JVET-M0106, 8 pages.

Han, Yu, et al., "CE4.4.6: Improvement on Merge/Skip mode", JVET of ITU-T SG 16 WP 3 and ISO/IEC JTC 1/SC 29/WG 11, 12th Meeting: Macao, CN, Oct. 3-12, 2018, Document: JVET-L0399, 10 pages.

Zhou, TianYang, et al., "Spatial-temporal merge mode (non sub-block STMVP) (JVET-K0161/K0532)", Slides, Jul. 13, 2018, XP055649965, 10 pages.

Le Leannec, F., et al., "CE4 related: simplified non-sub-block STMVP", Slides, JVET-L0207, Jul. 2018, 14 pages.

Bross et al., "Versatile Video Coding (Draft 2)", JVET-K1001-V6, Editors, Joint Video Experts Team (JVET) of ITU-T SG 16 WP 3 and ISO/IEC JTC 1/SC 29/WG 11, 11th Meeting: Ljubljana, SI, Jul. 10-18, 2018, 141 pages.

Chen et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.

ITU-T, "High Efficiency Video Coding", Recommendation ITU-T H.265, Series H: Audiovisual and Multimedia Systems, Infrastructure of Audiovisual Services—Coding of Moving Video, Oct. 2014, 540 pages.

* cited by examiner

MOTION VECTOR PREDICTION IN VIDEO ENCODING AND DECODING

TECHNICAL FIELD

The present disclosure involves video encoding and decoding.

BACKGROUND

To achieve high compression efficiency, image and video coding schemes such as that defined by the HEVC (High Efficiency Video Coding) standard usually employ predictive and transform coding to leverage spatial and temporal redundancy in the video content. Generally, intra or inter prediction is used to exploit the intra or inter frame correlation, then the differences between the original blocks and the predicted blocks, often denoted as prediction errors or prediction residuals, are transformed, quantized, and entropy coded. To reconstruct the video, the compressed data is decoded by inverse processes corresponding to the prediction, transform, quantization, and entropy coding. Recent additions to video compression technology include various versions of the reference software and/or documentation of the Joint Exploration Model (JEM) being developed by the Joint Video Exploration Team (JVET). An aim of efforts such as JEM is to make further improvements to existing standards such as HEVC.

SUMMARY

According to another general aspect of at least one embodiment, a method for encoding video data is presented comprising obtaining a first spatiotemporal motion vector prediction candidate based on at least two motion vectors being available among first or second spatial motion vectors associated with respective first and second spatial locations neighboring a current block, and a temporal motion vector co-located with a third spatial location associated with the current block, wherein the first spatial location is neighboring to the left of the current block and the second spatial location is neighboring above the current block, and based on a combination of the at least two motion vectors that are available; modifying a first value based on the first spatiotemporal motion vector prediction candidate being obtained; obtaining a second spatiotemporal motion vector prediction candidate based on the first value having a relationship to a second value representing a position in an ordered set of non-sub-block spatiotemporal motion vector prediction candidates, and based on at least two motion vectors being available among third or fourth spatial motion vectors or the temporal motion vector, wherein the third and fourth spatial motion vectors are associated with fifth and sixth spatial locations different from the first and second spatial locations, and wherein the fifth spatial location is neighboring to the left of the current block and the sixth spatial location is neighboring above the current block; including at least one of the first and second spatiotemporal motion vector prediction candidates in the ordered set of non-sub-block spatiotemporal motion vector prediction candidates; and encoding the video data to produce encoded video data based on the at least one of the first and second spatiotemporal motion vector prediction candidates.

According to another general aspect of at least one embodiment, apparatus for encoding video data is presented comprising at least one or more processors, wherein the one or more processors are configured for: obtaining a first spatiotemporal motion vector prediction candidate based on at least two motion vectors being available among first or second spatial motion vectors associated with respective first and second spatial locations neighboring a current block, and a temporal motion vector co-located with a third spatial location associated with the current block, wherein the first spatial location is neighboring to the left of the current block and the second spatial location is neighboring above the current block, and based on a combination of the at least two motion vectors that are available; modifying a first value based on the first spatiotemporal motion vector prediction candidate being obtained; obtaining a second spatiotemporal motion vector prediction candidate based on the first value having a relationship to a second value representing a position in an ordered set of non-sub-block spatiotemporal motion vector prediction candidates, and based on at least two motion vectors being available among third or fourth spatial motion vectors or the temporal motion vector, wherein the third and fourth spatial motion vectors are associated with fifth and sixth spatial locations different from the first and second spatial locations, and wherein the fifth spatial location is neighboring to the left of the current block and the sixth spatial location is neighboring above the current block; including at least one of the first and second spatiotemporal motion vector prediction candidates in the ordered set of non-sub-block spatiotemporal motion vector prediction candidates; and encoding the video data to produce encoded video data based on the at least one of the first and second spatiotemporal motion vector prediction candidates.

According to another general aspect of at least one embodiment, apparatus for decoding video data is presented comprising one or more processors, wherein the one or more processors are configured for: obtaining a first spatiotemporal motion vector prediction candidate based on at least two motion vectors being available among first or second spatial motion vectors associated with respective first and second spatial locations neighboring a current block, and a temporal motion vector co-located with a third spatial location associated with the current block, wherein the first spatial location is neighboring to the left of the current block and the second spatial location is neighboring above the current block, and based on a combination of the at least two motion vectors that are available; modifying a first value based on the first spatiotemporal motion vector prediction candidate being obtained; obtaining a second spatiotemporal motion vector prediction candidate based on the first value having a relationship to a second value representing a position in an ordered set of non-sub-block spatiotemporal motion vector prediction candidates, and based on at least two motion vectors being available among third or fourth spatial motion vectors or the temporal motion vector, wherein the third and fourth spatial motion vectors are associated with fifth and sixth spatial locations different from the first and second spatial locations, and wherein the fifth spatial location is neighboring to the left of the current block and the sixth spatial location is neighboring above the current block; including at least one of the first and second spatiotemporal motion vector prediction candidates in the ordered set of non-sub-block spatiotemporal motion vector prediction candidates; and decoding the video data to produce decoded video data based on the at least one of the first and second spatiotemporal motion vector prediction candidates.

According to another general aspect of at least one embodiment, a method for decoding video data is presented comprising obtaining a first spatiotemporal motion vector prediction candidate based on at least two motion vectors being available among first or second spatial motion vectors associated with respective first and second spatial locations neighboring a current block, and a temporal motion vector co-located with a third spatial location associated with the current block, wherein the first spatial location is neighboring to the left of the current block and the second spatial location is neighboring above the current block, and based on a combination of the at least two motion vectors that are available; modifying a first value based on the first spatiotemporal motion vector prediction candidate being obtained; obtaining a second spatiotemporal motion vector prediction candidate based on the first value having a relationship to a second value representing a position in an ordered set of non-sub-block spatiotemporal motion vector prediction candidates, and based on at least two motion vectors being available among third or fourth spatial motion vectors or the temporal motion vector, wherein the third and fourth spatial motion vectors are associated with fifth and sixth spatial locations different from the first and second spatial locations, and wherein the fifth spatial location is neighboring to the left of the current block and the sixth spatial location is neighboring above the current block; including at least one of the first and second spatiotemporal motion vector prediction candidates in the ordered set of non-sub-block spatiotemporal motion vector prediction candidates; and decoding the video data to produce decoded video data based on the at least one of the first and second spatiotemporal motion vector prediction candidates.

In general, another aspect involves a bitstream formatted to include encoded video data, wherein the encoded video data are encoded by at least one method described herein.

One or more of the present embodiments also provide a computer readable storage medium having stored thereon instructions for encoding or decoding video data according to the methods or the apparatuses described herewith. The present embodiments also provide a computer readable storage medium having stored thereon a bitstream generated according to the methods or the apparatuses described herewith. The present embodiments also provide methods and apparatuses for transmitting or receiving the bitstream generated according to methods or the apparatuses described herewith.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

BRIEF DESCRIPTION OF THE DRAWINGS

The present disclosure may be better understood by consideration of the detailed description below in conjunction with the accompanying figures, in which.

It should be understood that the drawings are for purposes of illustrating examples of various aspects and embodiments and are not necessarily the only possible configurations. Throughout the various figures, like reference designators refer to the same or similar features.

DETAILED DESCRIPTION

In general, at least one embodiment involves a method for determining the spatiotemporal motion vector (MV) predictor of a block's motion vector, where a reduced number of spatiotemporal candidate positions are considered to construct the spatiotemporal MV predictor of a current block. Various modifications and embodiments are envisioned as explained below that can provide improvements to a video coding system including but not limited to one or both of increased compression or coding efficiency and decreased complexity.

Figure 1:
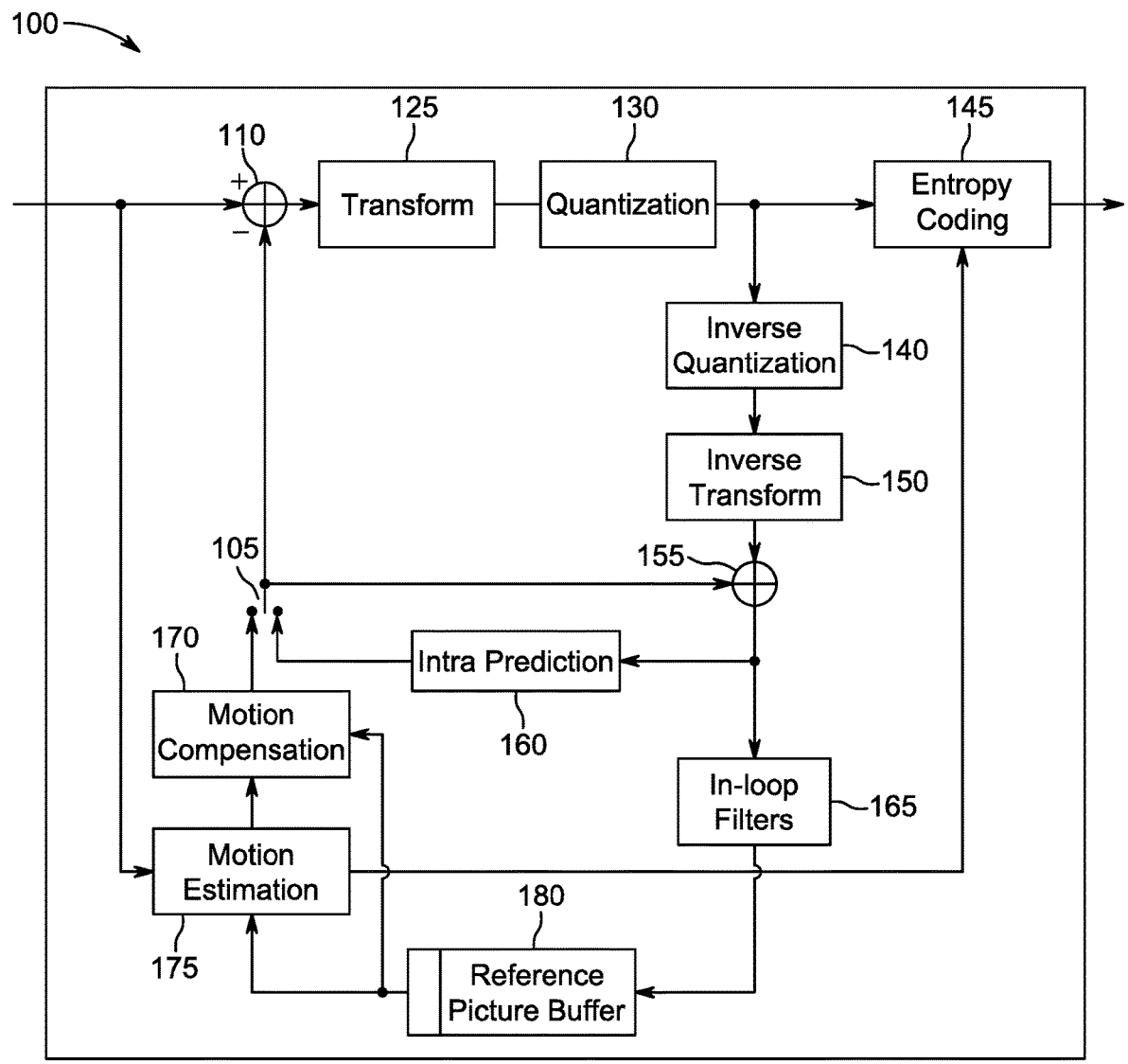
FIG. 1 provides a block diagram depicting an example of an embodiment of a video encoder.

Turning now to the figures, FIG. 1 illustrates an example of a video encoder 100, such as an HEVC encoder. HEVC is a compression standard developed by *Joint Collaborative*

Team on Video Coding (JCT-VC) (see, e.g., "ITU-T H.265 TELECOMMUNICATION STANDARDIZATION SECTOR OF ITU (October 2014), SERIES H: AUDIOVISUAL AND MULTIMEDIA SYSTEMS, Infrastructure of audiovisual services—Coding of moving video, High efficiency video coding, Recommendation ITU-T H.265"). FIG. 1 may also illustrate an encoder in which improvements are made to the HEVC standard or an encoder employing technologies similar to HEVC, such as an encoder based on or improved upon JEM (Joint Exploration Model) under development by JVET.

In the present application, the terms "reconstructed" and "decoded" may be used interchangeably, the terms "pixel" and "sample" may be used interchangeably, and the terms "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In encoder 100 in FIG. 1, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
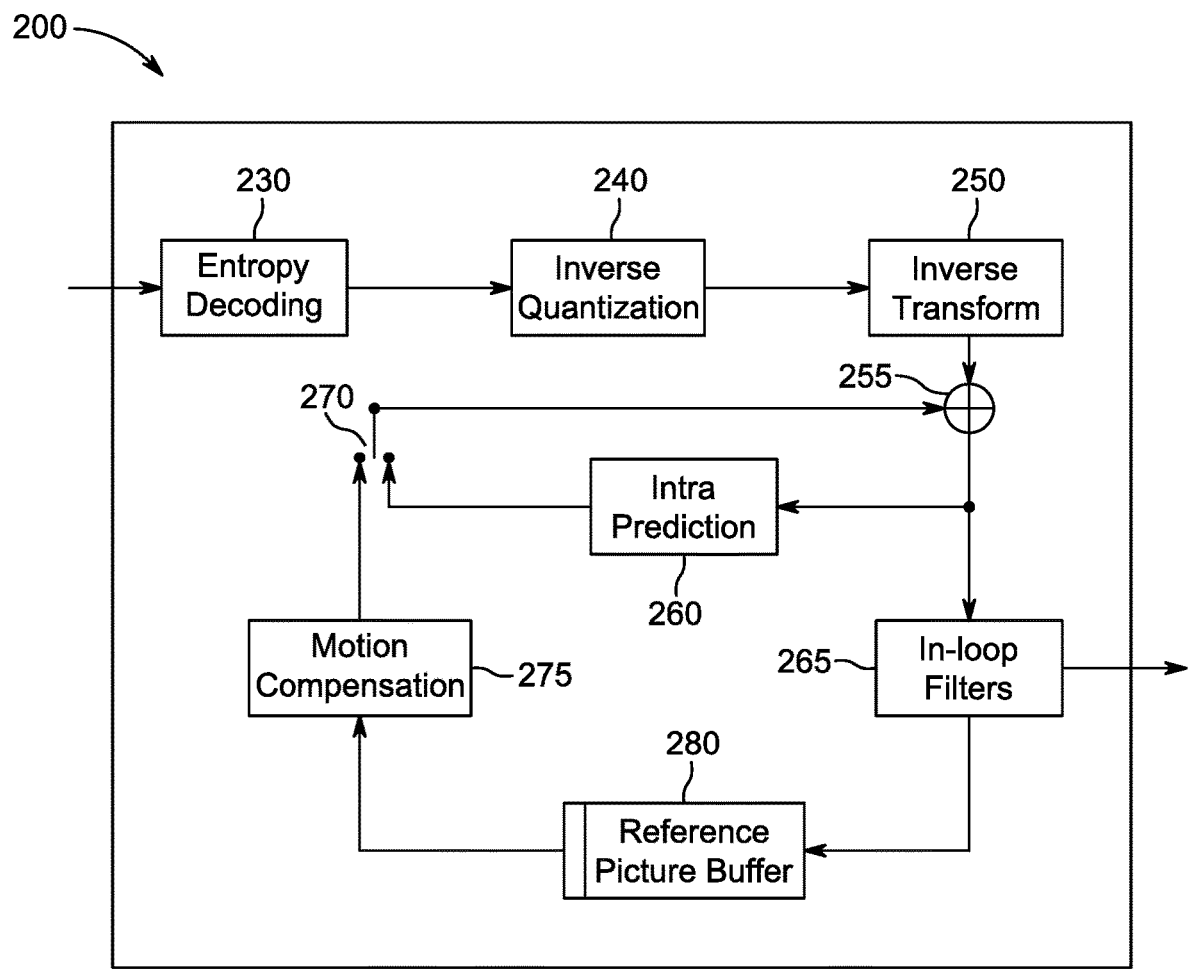
FIG. 2 provides a block diagram depicting an example of an embodiment of a video decoder.

FIG. 2 illustrates a block diagram of an example of a video decoder 200, such as an HEVC decoder. In the example decoder 200, a signal or bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a decoder based on or improved upon JEM.

In particular, the input of the decoder includes a video signal or bitstream, which can be generated by a video encoder such as video encoder 100 of FIG. 1. The signal or bitstream is first entropy decoded (230) to obtain transform coefficients, motion vectors, and other coded information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). Advanced Motion Vector Prediction (AMVP) and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

Figure 3:
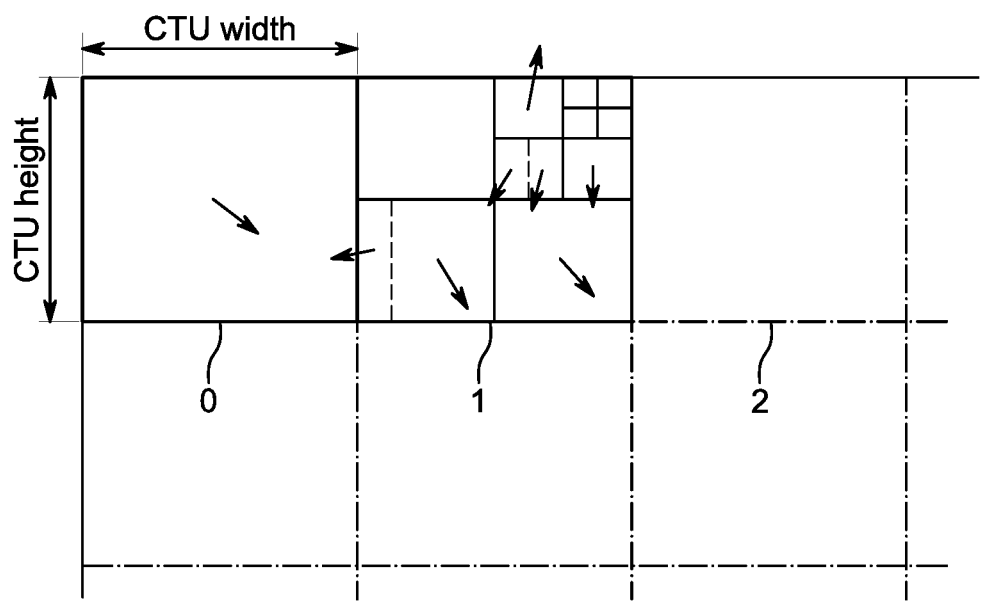
FIG. 3 illustrates aspects of the present disclosure involving a Coding Tree Unit (CTU)

In the HEVC video compression standard, motion compensated temporal prediction is employed to exploit the redundancy that exists between successive pictures of a video. To do so, a motion vector is associated to each prediction unit (PU). Each Coding Tree Unit (CTU) is represented by a Coding Tree (CT) in the compressed domain. This is a quad-tree division of the CTU, where each leaf is called a Coding Unit (CU) as illustrated in FIG. 3.

Figure 4:
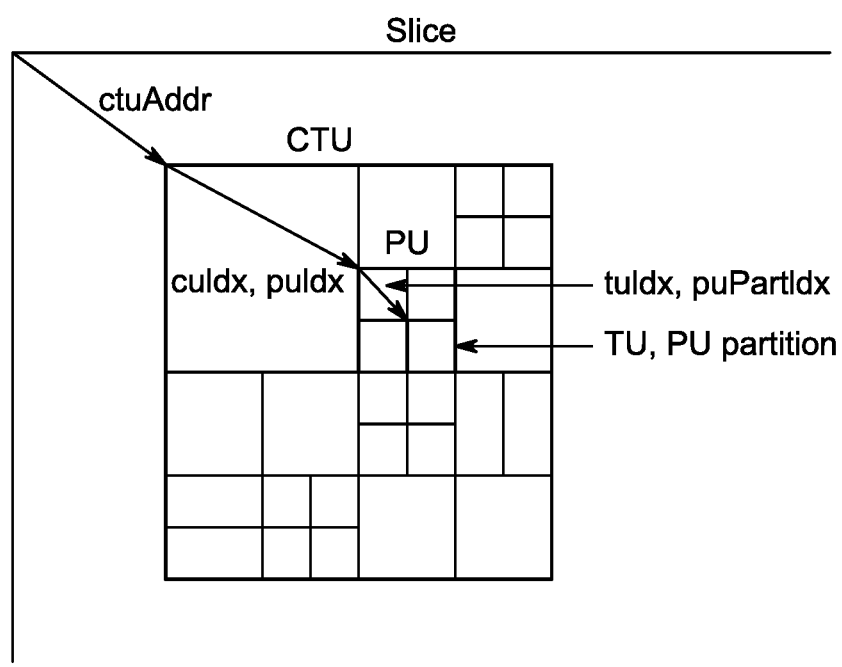
FIG. 4 illustrates aspects of the present disclosure involving a CTU and Coding Unit (CU)

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level as illustrated in FIG. 4 which shows an example of division of a Coding Tree Unit into Coding Units, Prediction Units and Transform Units Exactly one Motion Vector is assigned to each PU in HEVC. This motion vector is used for motion compensated temporal prediction of the considered PU. Therefore, in HEVC, the motion model that links a predicted block and its reference block involves a translation.

Two modes are employed in HEVC to encode the motion data. They are respectively called AMVP (Adaptive Motion Vector Prediction) and Merge. AMVP involves signaling the reference picture(s) used to predict current PU, the Motion Vector Predictor index (taken among a list of two predictors) and a motion vector difference. In general, at least one embodiment as described herein involves the merge mode.

The merge mode comprises signaling and decoding the index of some motion data collected in a list of motion data predictors. The list is made of five candidates and is constructed the same way on the decoder and on encode sides. Therefore, the merge mode aims at deriving some motion information taken from the merge list. The merge list typically contains the motion information associated to some spatial and temporal surrounding blocks, available in their decoded state when the current PU is being processed.

In the Joint Exploration Model (JEM) developed by the JVET (Joint Video Exploration Team) group, some additional temporal prediction tools with associated parameters determined at the decoder side, include Spatiotemporal Motion Vector Prediction (STMVP). The basic principle of STMVP is to predict a 4×4 sub-block-based motion field for the current PU. This is done through a recursive sub-block-to-sub-block motion vector derivation. For each sub-block, the predicted MV is the average of the surrounding top, left and temporal neighboring blocks' motion vectors, for each reference list.

One approach includes a version of the STMVP tool which does not use sub-blocks of the current block being processed. The process involves searching some surrounding motion vector at some given candidate spatial positions. The found available spatial neighbors of the current block and the temporal motion vector predictor of a current PU are averaged to form the motion vector predictor of a current CU. Up to four spatial positions are checked to find two available spatial motion vector predictors to be averaged. An advantage of this approach is that the PU is not divided into sub-blocks. A single spatiotemporal motion vector predictor is derived for the whole PU which provides a coding gain.

In general, at least one embodiment involves a spatiotemporal motion vector derivation to generate some candidate motion data candidate predictor to be part of the merge candidate list used in the merge mode. A reduced number of spatial positions are considered in the construction of the STMVP merge candidate. As a result, fewer tests are used in the decoding process. Indeed, for each spatial position visited in the process, two tests are driven to check that some decoded PU information is available at the considered neighboring spatial position, and to check the coding mode (Intra/Inter) of the corresponding Coding Unit. Reduced complexity is obtained without any penalty in terms of compression efficiency.

In general, at least one embodiment can include a merge candidate being determined or obtained from the average between at least two motion vectors taken from spatial positions around the current CU. Only two spatial positions are considered, and no temporal candidate is being retrieved. The two envisioned candidates are taken at middle position along the top and left edges of a current PU.

In general, at least one embodiment can include a merge candidate being determined or obtained from a combination, e.g., an average, between two spatial candidates MV located at the same positions as described in regard to the preceding embodiment, and a temporal candidate MV. An increased coding efficiency (around 0.1% average bitrate reduction) may be realized in comparison to the preceding embodiment.

In general, another embodiment involves the way the temporal candidate MV is being retrieved. In accordance with one aspect, the temporal MV at spatial position below and on the right of current CU can be chosen. Some variants are presented later. Such embodiments and/or variants can provide improvements in the trade-off between coding efficiency and decoder complexity.

In general, at least one additional embodiment involves a policy to decide if the proposed STMVP is available or not.

In general, at least one additional embodiment can provide an improved order in which the list of merge candidates is constructed.

In general, at least one additional embodiment can provide for constructing spatiotemporal MV predictors resulting in improved coding efficiency.

In general, at least one additional embodiment provides for use of the proposed STMVP motion vector predictor in regard to the AMVP inter coding mode.

Merge mode in the HEVC standard involves deriving the inter prediction information (also called motion information in the following) of a given prediction unit from a selected motion information predictor candidate. The motion information includes all the inter prediction parameters of a PU, that is to say:

The uni-directional or bi-directional temporal prediction type

The reference picture index within each reference picture list

The motion vector(s)

Figure 5:
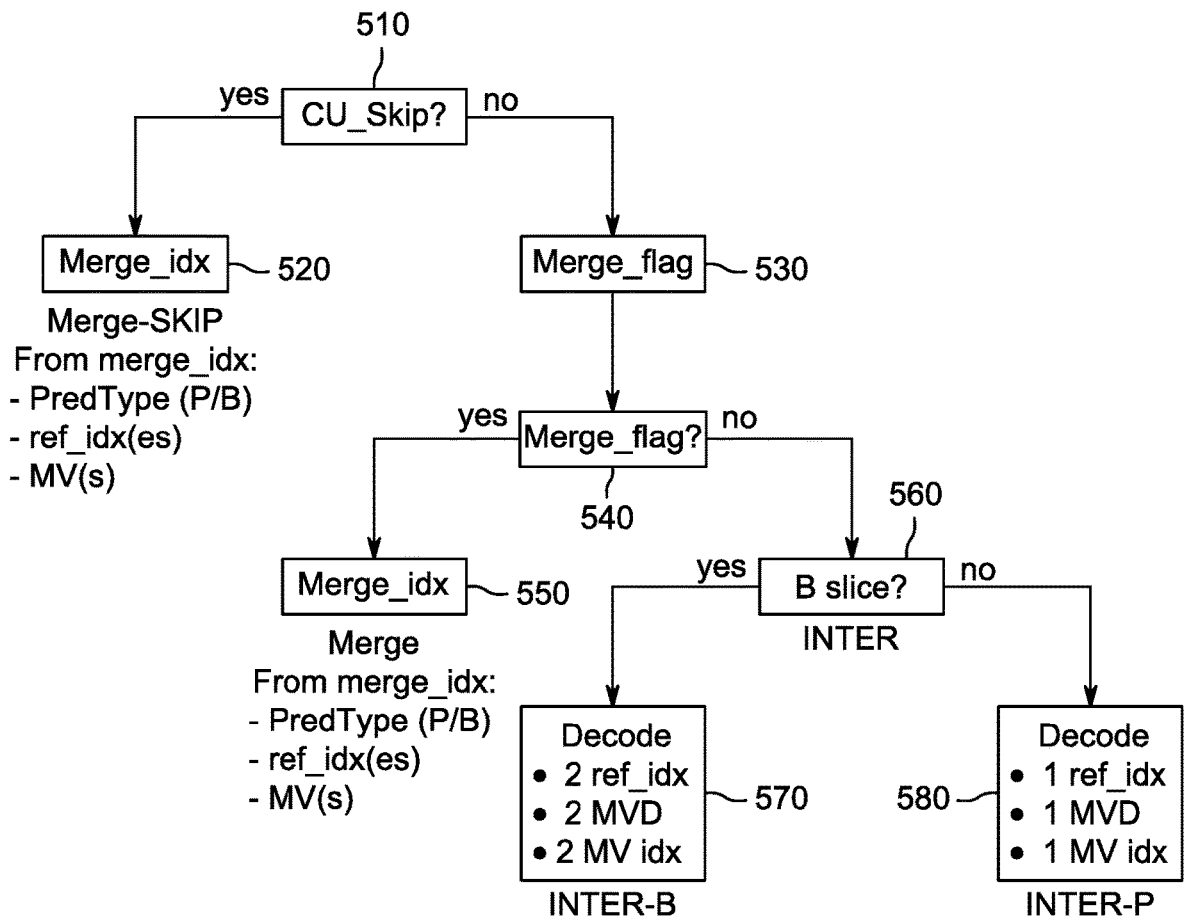
FIG. 5 provides a flow diagram illustrating signaling of inter prediction information.

The coding and decoding of inter prediction information in HEVC is summarized in FIG. 5 which illustrates signaling of the inter prediction information. As can be seen, the motion information coding/decoding according to the merge mode takes place in two modes: the skip mode and the merge mode. In these two modes, one single field is being signaled to make the decoder able to retrieve the motion information of a PU: the so-called merge index. The merge index indicates which Motion Vector predictor in the list of merge motion information predictor is used to derive the motion information of current PU. In the following, the list of motion information predictors is called the merge list, or merge candidate list. Moreover, a candidate motion information predictor is called a merge candidate.

Figure 6:
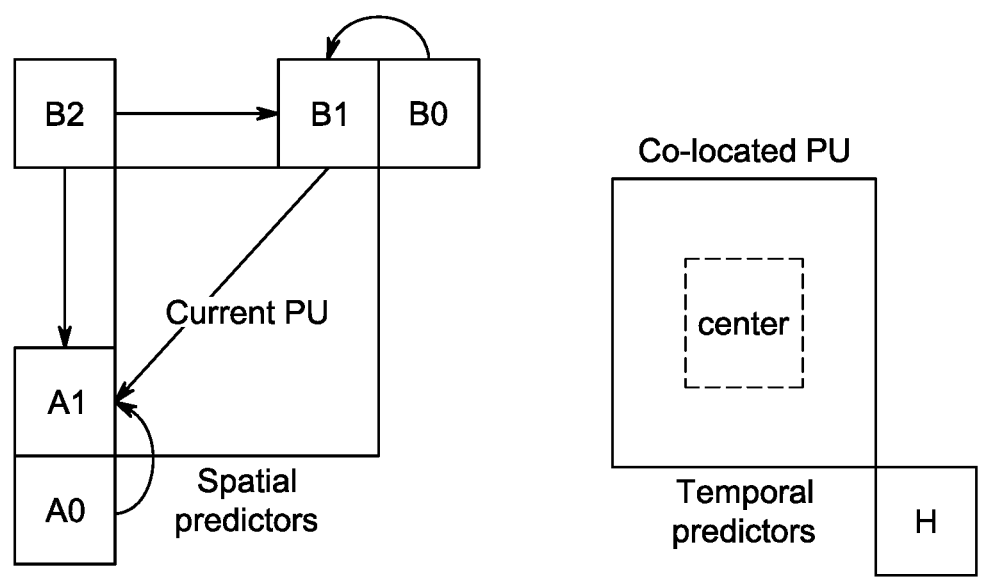
FIG. 6 provides a block diagram illustrating positions of spatial and temporal motion vector predictors used in merge mode.
Figure 7:
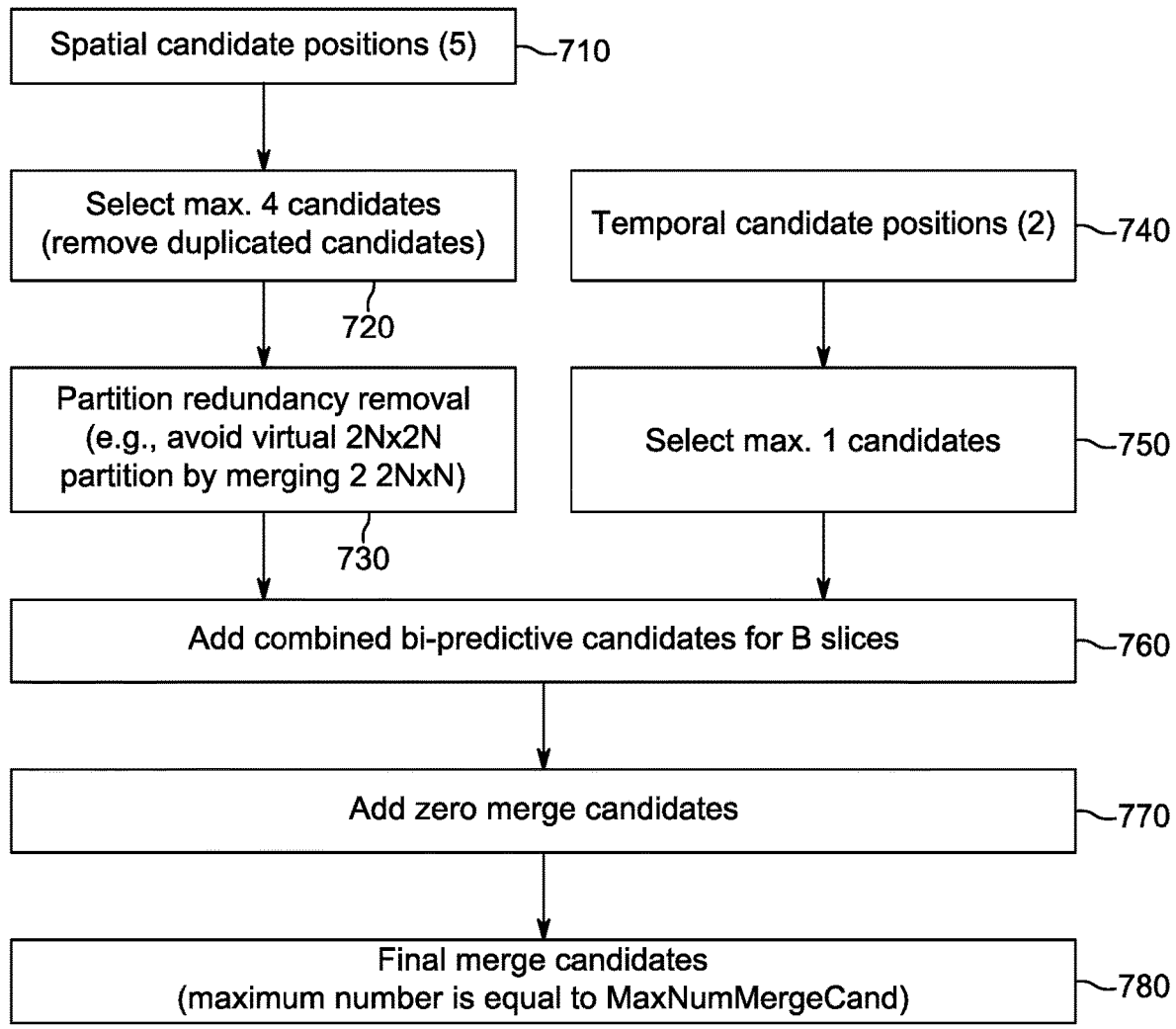
FIG. 7 provides a flow diagram illustrating creating the list of merge motion vector predictor candidates.

In HEVC, the merge candidate list is systematically made of five merge candidates. The merge list is constructed, both on the encoder and on the decoder sides, as follows. As can be seen in FIG. 6, up to five spatial positions can be considered to retrieve some potential candidates. They are visited according to the following order:

1—Left (A1)
2—Above (B1)
3—Above right (B0)
4—Left bottom (A0)
5—Above left (B2)

where the symbols A0, A1, B0, B1, B2 denote the spatial position shown on the left side of FIG. 6. In FIG. 6, positions of spatial and temporal motion vector predictors used in the merge mode with spatial merge candidates are illustrated on the left side of FIG. 6 and temporal merge candidates are illustrated on the right side of FIG. 6. Four spatial candidates which are different from each other are selected. Then a temporal predictor denoted TMVP is selected, by considered the temporal motion information located at position H, and then "center" is a candidate at position H in the considered reference picture that is not available. A last pruning process then takes place (see FIG. 7), to ensure the selected set of spatial and temporal candidates does not contain redundant candidates.

Figure 8:
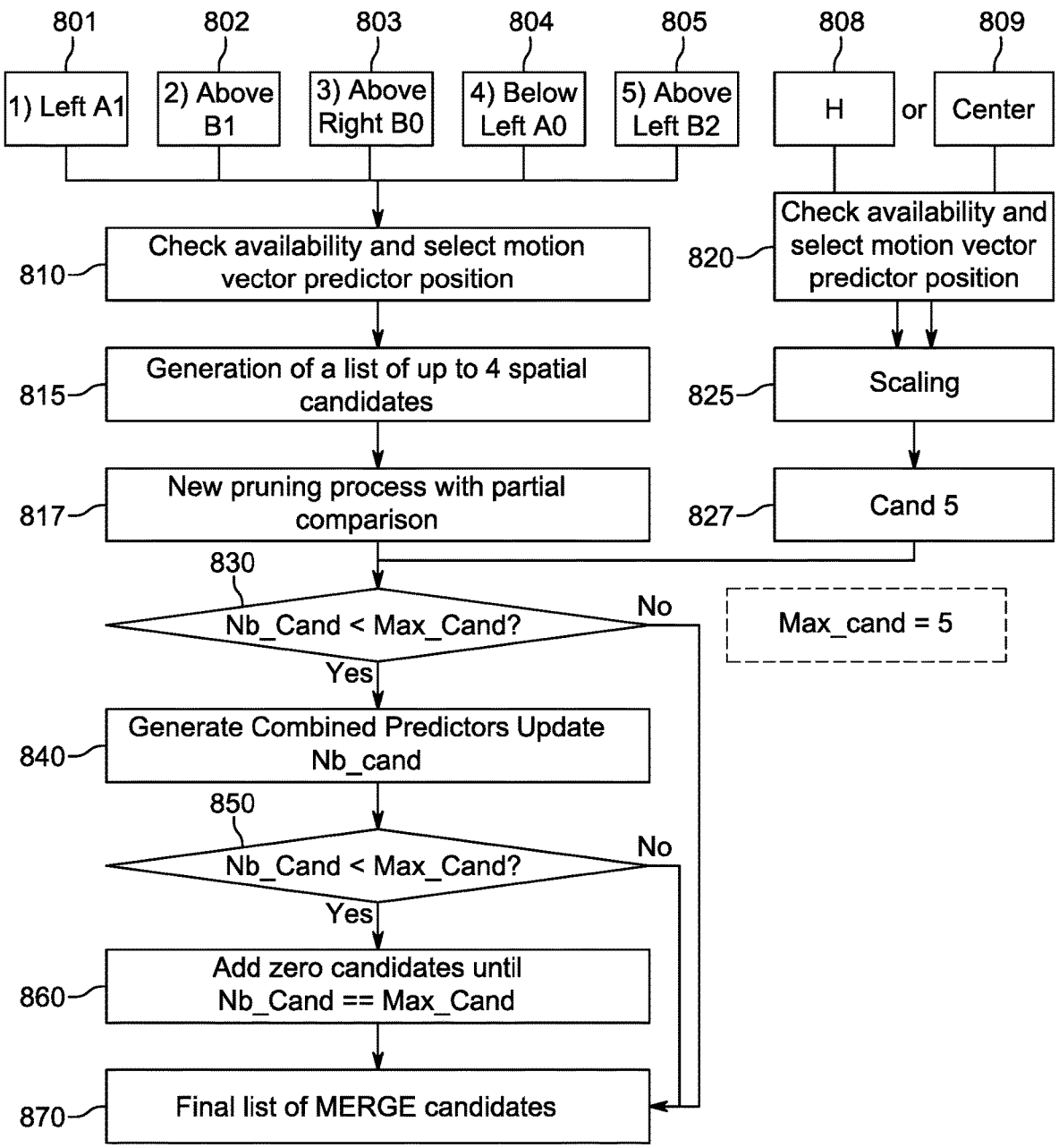
FIG. 8 provides another flow diagram illustrating creating the list of merge motion vector predictor candidates.

Next, in the case of a B slice, candidates of another type are pushed to the merge list if it is not full: the so-called combined candidates. This can involve forming a candidate made of the motion information associated with one reference picture list (L0) from one candidate already present in the list, with the motion associated to the other reference picture list (L1) from another candidate already present in the merge list. If the merge list is still not full (five elements) then zero motion vectors are pushed to the back of the merge list until it is full. The overall process of merge list construction in HEVC is detailed in the diagram of FIG. 8.

Figure 9:
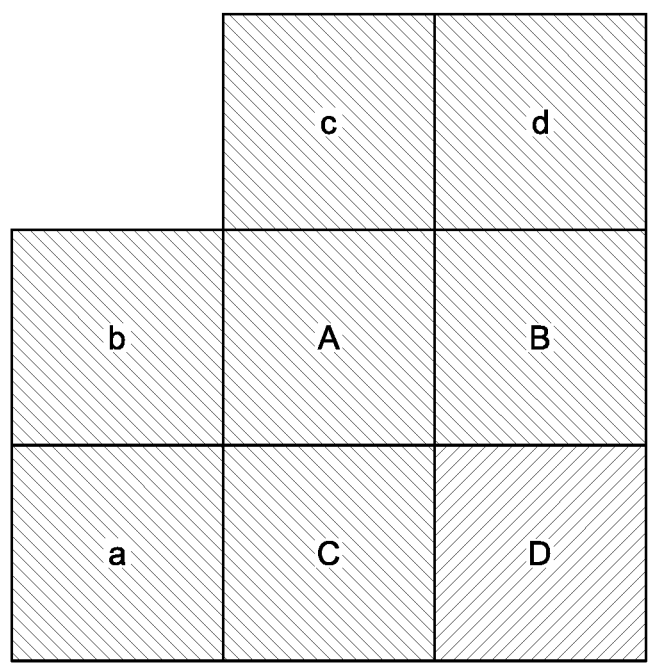
FIG. 9 illustrates recursive derivation of a spatiotemporal motion vector predictor (STMVP) merge candidate.

A first approach to determining the STMVP (spatiotemporal motion vector prediction) merge candidate used in a video codec can include the following. Here a block (typically a prediction unit or coding unit) is divided into sub-block or sub-PUs, typically of size 4×4. This is illustrated in FIG. 9, where A, B, C, D are the 4×4 sub-blocks contained in current block (of size 8×8). Blocks a, b, c, d represents the neighboring 4×4 blocks of current block. In the STMVP merge candidate construction of this approach, a motion vector for each sub-block is derived recursively, in a raster scan order.

For each sub-block, its top and left neighboring motion vectors are retrieved. Each so-obtained motion vector from each reference picture list is scaled to the temporal position of the first reference picture in the considered reference picture list. In addition, the temporal motion vector predictor (TMVP) of the considered sub-block is obtained following the temporal motion vector prediction of HEVC. In the case where current sub-block is the block A of FIG. 9, the described approach involves retrieving the motion vector of the co-located block of block D, and scaling. As a result, the STMVP motion vector assigned to the current sub-block is computed as the average of the up-to-3 retrieved neighboring spatial and temporal motion vectors.

Figure 10:
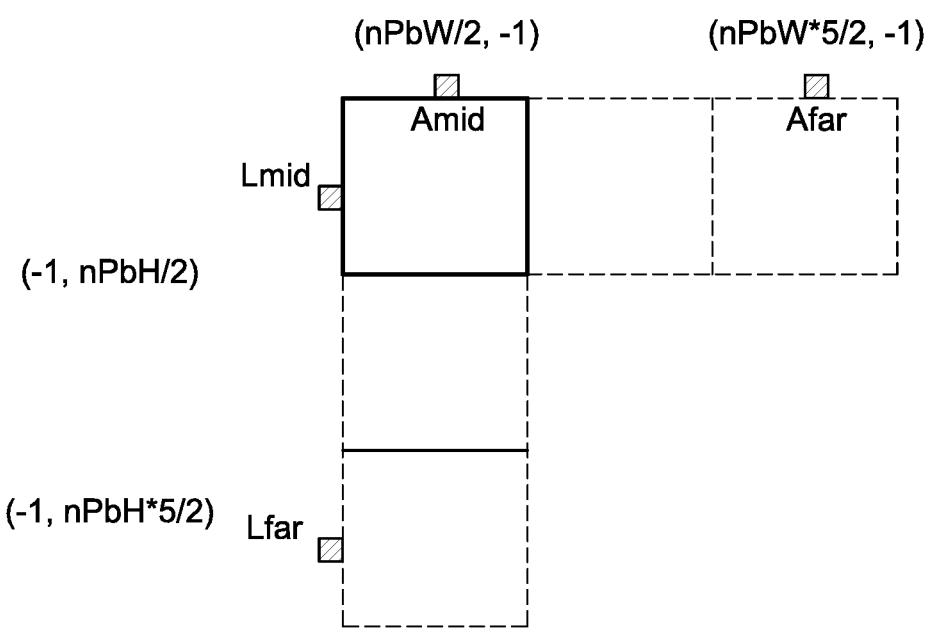
FIG. 10 illustrates spatial positions considered for determining a non-sub-block STMVP merge candidate.

A second approach to generating a STMVP merge candidate does not divide a PU into sub-blocks. The method involves retrieving two top and left spatial neighboring motion vectors of a current PU, and the temporal motion vector predictor of a current CU. The spatial neighbors are taken at a spatial position called Afar as illustrated in FIG. 10 which provides an example of spatial position being considered in the determination of a non-sub-block STMVP merge candidate. The spatial position of Afar relative to the top-left position of the current PU is given by coordinates (nbPW*5/2, −1). Here nbPW is the width of current block. If no motion vector is available at position Afar (not present or intra coded), then the position Amid is considered as the top-neighboring motion vector of current block.

The choice of the left neighboring block is similar. If available, the neighboring motion vector at relative spatial position (−1, nbPH/2), noted Lfar, is chosen. nbPH is the height of the current block. If not available then the left neighboring motion vector at position Lmid (−1, nbPH/2), is chosen, if it is available.

A variant of the spatial position illustrated in FIG. 10 can be used in one or more of the approaches described above. For example, one could use the following:

$A\text{far}=(2*nbPW,-1)$ $A\text{mid}=(nbPW-1,-1)$ $L\text{far}=(-1,2*nbPH)$ $L\text{mid}=(-1,nbPH-1)$ Next, the TMVP predictor of a current block is derived, e.g., as in the temporal motion vector prediction of HEVC. Finally, the STMVP merge candidate of a current block can be computed as the average of the up-to-three obtained spatial and temporal neighboring motion vectors. Therefore, the STMVP candidate here is made of at most one motion vector per reference picture list, as opposed to the sub-block-based approach of the first approach described above.

Figure 11:
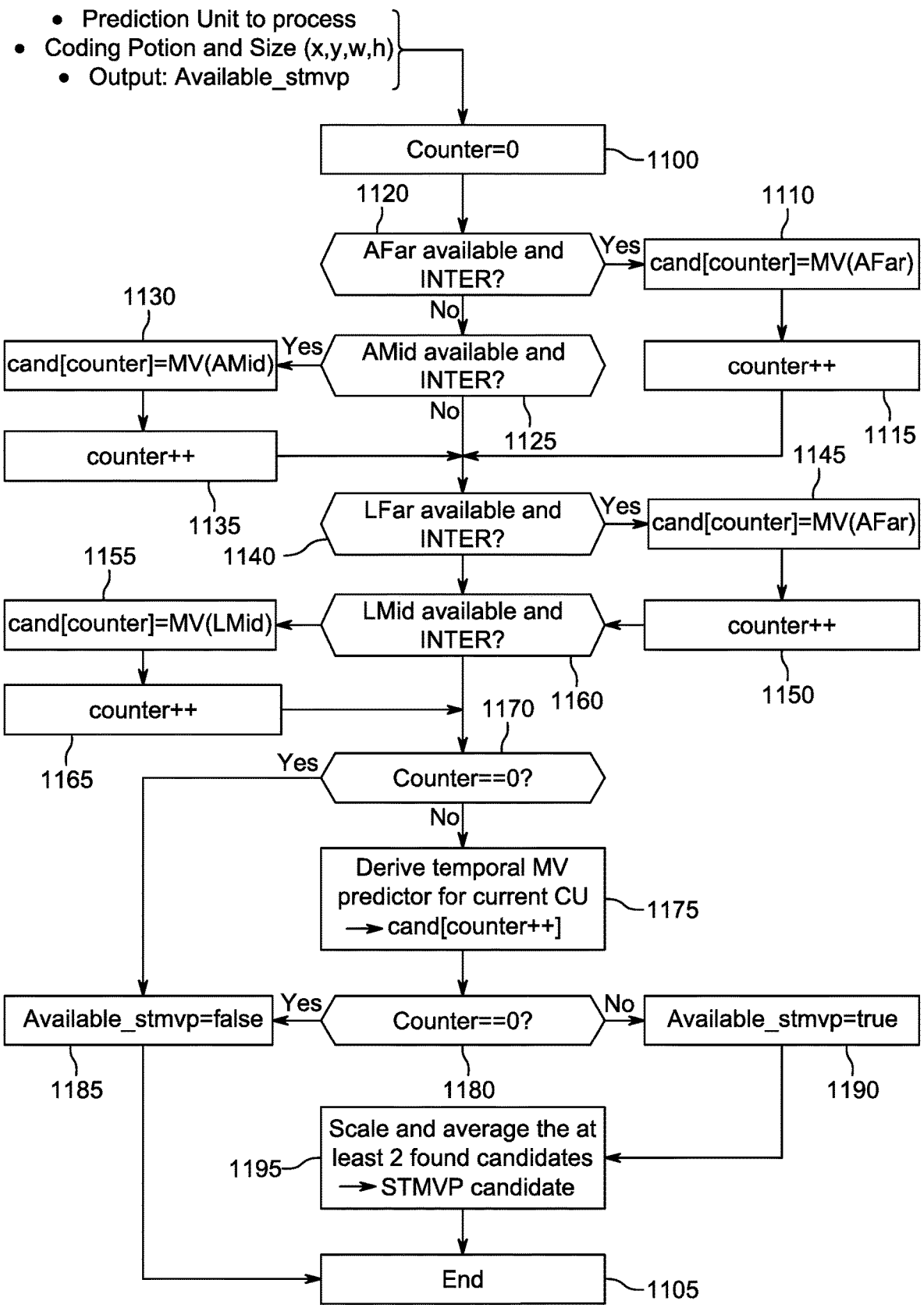
FIG. 11 provides a flow diagram illustrating an overall method of determining a non-sub-block STMVP merge candidate.

A method to determine a non-sub-block-based STMVP merge candidate, e.g., the second approach described above, is depicted in FIG. 11. The inputs to this process are the block (PU) currently being processed, its position and its size. The output of the process is the flag "Available_stmvp" that is equal to "true" if a STMVP candidate has been determined by the method and is equal to "false" otherwise.

The first part of the method corresponds to the retrieval of the spatial neighboring motion vector. It is followed by the derivation of the temporal motion vector predictor of current block. Finally, the average of the retrieved motion vectors is computed. Note that if no spatial or temporal neighboring MV is retrieved, then the output flag of the process "Available_stmvp" is set to false. This means the average is computed between one to three motion vectors.

Figure 12:
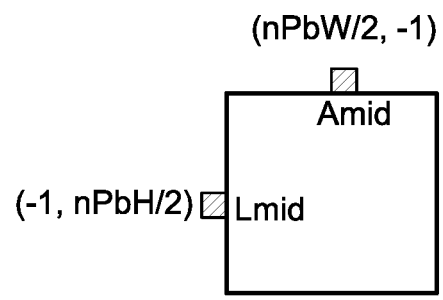
FIG. 12 illustrates an example of an embodiment of spatial positions considered for determining a non-sub-block STMVP merge candidate.

In general, various examples of embodiments as explained below can include a STMVP merge candidate being determined without any division of the current block into sub-blocks and as a combination of a top, a left and a temporal neighboring motion vectors of the current block as described above. In addition, in at least one embodiment, for example, the spatial position envisioned in the derivation of a left and spatial neighboring motion vectors include only the Amid and Lmid spatial positions around the current block. This is illustrated on FIG. 12.

One result is that a reduced number of tests is needed to derive these spatial MV predictors in comparison to a scenario that involves the testing of four spatial positions such as in the second approach described above. This scenario involves the maximum number of operations and checks in the decoding process and can be considered to be a "worst-case" scenario.

In at least one embodiment, for example, a variant of the preceding embodiment can comprise Amid and Lmid corresponding to some other spatial positions. For example, they may respectively correspond to the above-right (A1) and bottom-left (B1) positions around the current block.

Figure 13:
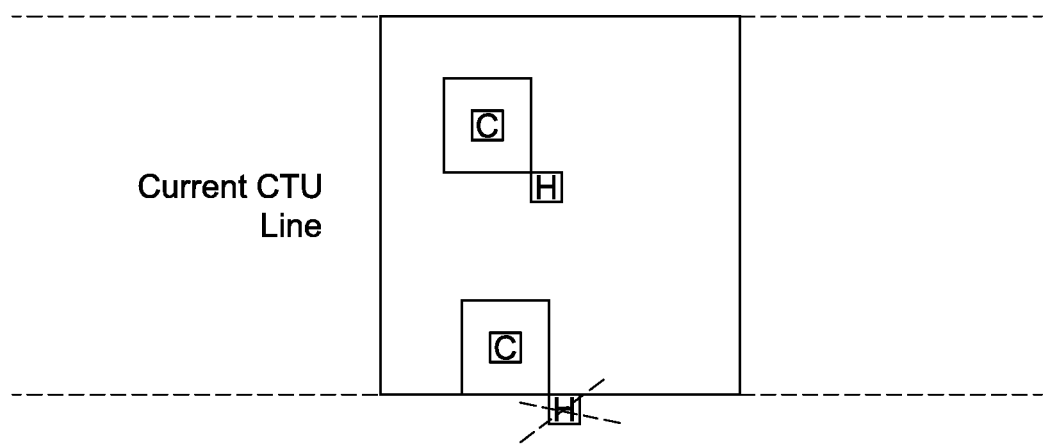
FIG. 13 illustrates an approach to temporal motion vector predictor candidate derivation.
Figure 14:
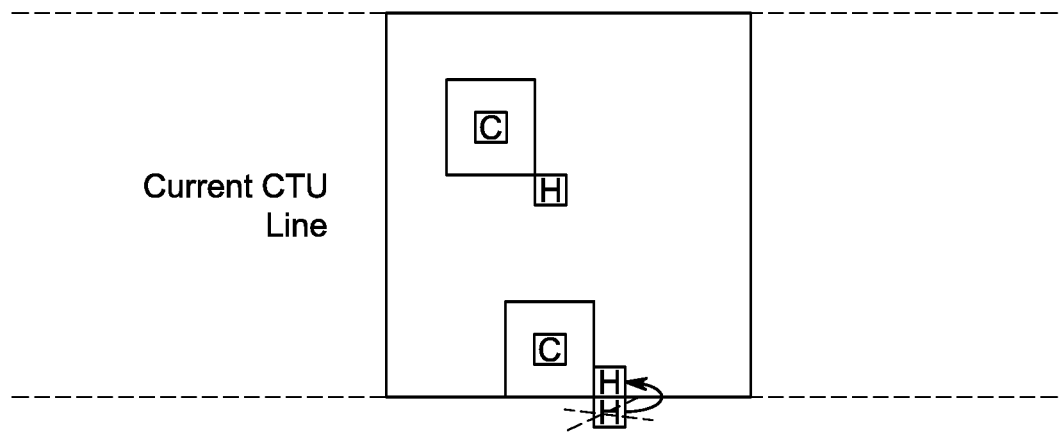
FIG. 14 illustrates an example of an embodiment providing a temporal motion vector predictor for determination of a non-sub-block STMVP merge candidate.

In at least one other embodiment, for example, the temporal motion vector predictor is modified and can be determined as illustrated in FIG. 14. In FIG. 14, spatial position H is defined as the 4×4 sub-block position on the right and on the bottom of the bottom-right corner of the current block. If the spatial position H lies outside the current line of CTUs, then the co-located blocks of position H are considered as unavailable. In that case, such as in the arrangement shown in FIG. 13, the spatial position corresponding to the center of current block is considered, and a co-located motion vector at that center position is being retrieved. Here, it is proposed to define the spatial position H as the 4×4 sub-block position on the right of the bottom-right corner of current CU. This position is contained in the current line of CTUs, as shown by FIG. 14. Therefore, in that case, the newly defined H position is considered as valid, and the process checks if some MVs co-located to that position are available in the co-located slice of current slice. If not, then the center of the current block is used as the fallback spatial position where to retrieve co-located motion vectors. The advantage of this characteristics is that is improves the overall coding efficiency, if used in the construction of the non-sub-block STMVP merge candidate. In addition, it does not bring any complexity of the decoder in terms of the number of checks and operations in the worst-case scenario.

In at least one other embodiment, the temporal motion vector prediction of FIG. 14 can be used not only in the construction of the STMVP merge candidate, but also in the derivation of the temporal motion vector predictor, usually used in the merge mode and noted TMVP. An aspect of this embodiment can be that only one temporal motion vector predictor is derived in the overall merge mode. It is shared between the STMVP merge mode and TMVP mode and, therefore, can be computed only once for two different merge modes. This keeps the maximum of one temporal motion vector predictor computed for a given prediction unit. Thus, the complexity of the decoding process with regards to the maximum number of temporal candidates does not increase.

In at least one other embodiment, for example, a characteristic of the determination of the STMVP merge candidate involves the condition on which the STMVP merge candidate is determined as available or not. Here, the STMVP merge candidate can be considered as available if at least two motion vectors (spatial and/or temporal) have been obtained. Therefore, the number of motion vectors combined, e.g., to compute the average motion vector, is comprised between two and three. A result can be a coding efficiency improvement.

Figure 15:
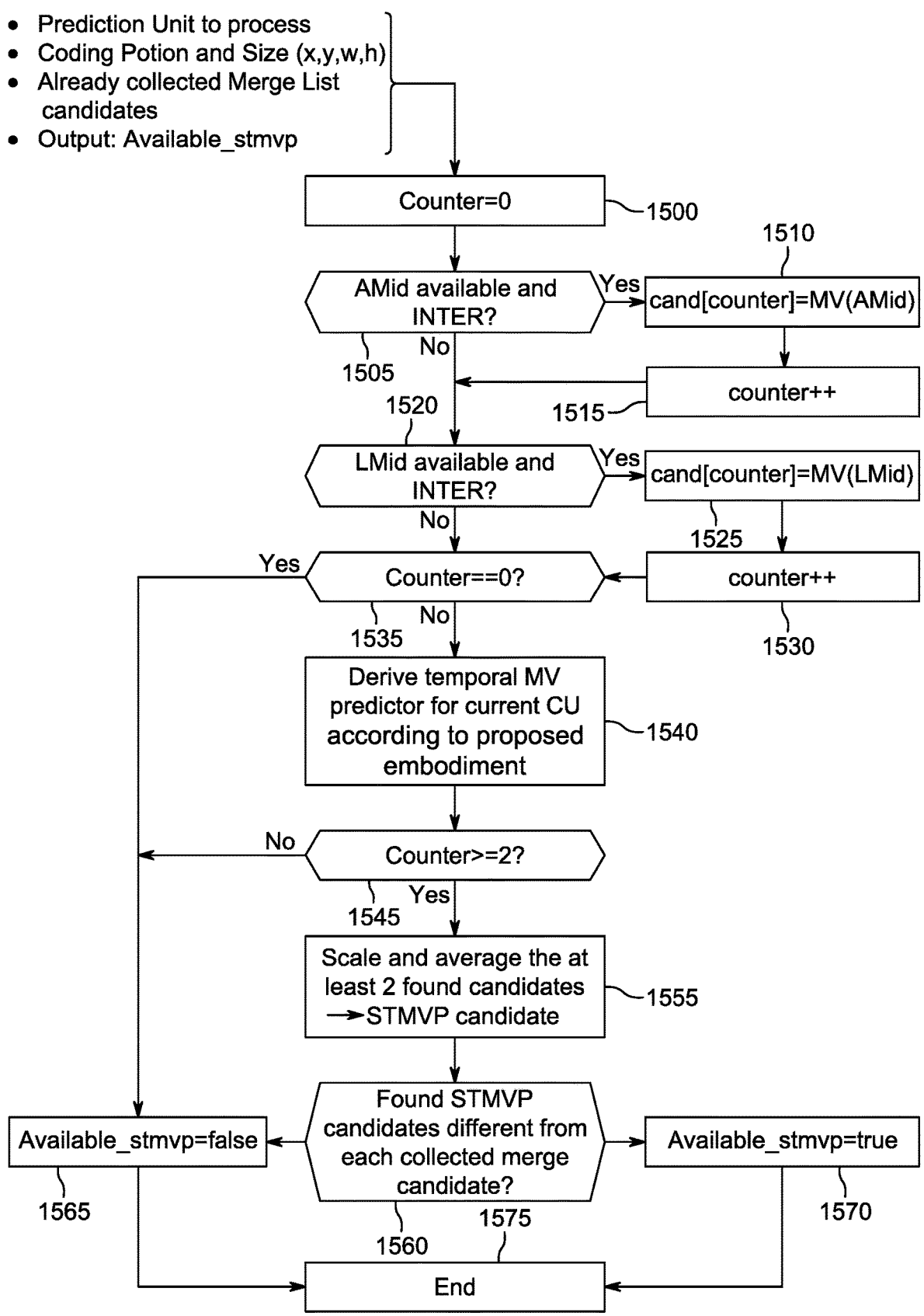
FIG. 15 provides a flow diagram illustrating an embodiment for determining a non-sub-block STMVP for merge mode.

FIG. 15 illustrates an example of an embodiment of a method providing a non-sub-block STMVP merge mode incorporating aspects of the previously described embodiments.

In the first and second approaches described above, the ordering of the list of merge candidates is as follows:
6—Left (A1)
7—Above (B1)
8—Above right (B0)
9—Left bottom (A0)
10—Above left (B2)
11—TMVP
12—Combined predictors
13—Zero motion vectors In a third approach that includes the alternative temporal motion vector prediction (ATMVP), merge mode has been adopted. Basically, it involves retrieving the motion information from a reference picture and pointed to by a motion vector. The motion vector and reference picture index used are those derived from the first merge candidate in the classical merge list above. Therefore, the ordered list of merge candidates is the following one.
1—Left (A1)
2—Above (B1)
3—Above right (B0)
4—Left bottom (A0)
5—ATMVP
6—Above left (B2)
7—TMVP
8—Combined predictors
9—Zero motion vectors In the second approach above, the STMVP merge candidate, can be inserted just after the ATMVP candidate in the merge list. This leads to the following order list:
10—Left (A1)
11—Above (B1)
12—Above right (B0)
13—Left bottom (A0)
14—ATMVP
15—STMVP
16—Above left (B2)
17—TMVP
18—Combined predictors
19—Zero motion vectors In at least one of the embodiments described herein, the merge list order can be modified as follows:
1—Left (A1)
2—Above (B1)
3—ATMVP
4—STMVP
5—Above right (B0)
6—Left bottom (A0)
7—Above left (B2)
8—TMVP
9—Combined predictors
10—Zero motion vectors This order can be selected based on the observation that the ATMVP and STMVP candidates provide significant coding efficiency improvement, compared to the case where they are deactivated. In addition, an aspect involves giving them a higher priority in the list. Then, they are considered earlier in the merge list construction process and are more likely to be considered before the maximum number of merge candidates is reached.

Figure 16:
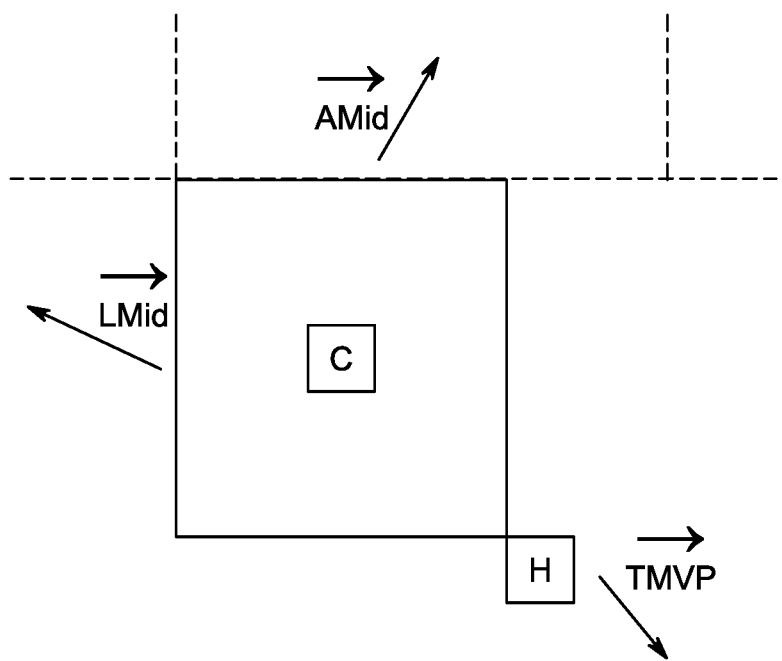
FIG. 16 illustrates an example pertaining to determining an STMVP to include in a merge list.

In at least one other embodiment, conditions can be placed on the relevance to obtain the combination of, e.g., compute the average of, some derived spatial and temporal neighboring motion vectors of current CU. Typically, one understands that if the average of the two or three retrieved MVs is equal or close to the zero motion vector, while the derived motion vectors are far from the zero MV, then it is likely not relevant to include the STMVP candidate into the merge list. This is illustrated in FIG. 16. Therefore, an aspect of at least one embodiment can involve considering the STMVP candidate as potentially relevant based on the average MV. For example, this can take the following form. If the $L_\infty$ norm of the average motion vector is negligible compared to the $L_\infty$ norm of each retrieved motion vector, then the average motion vector is considered as not usable in the STMVP merge candidate. Thus, this criteria involves evaluating the following test:

$$\frac{\|\text{Average}(\vec{Amid}, \vec{Lmid}, \vec{TMVP})\|_\infty}{\min(\|\vec{Amid}\|_\infty, \|\vec{Lmid}\|_\infty, \|\vec{TMVP}\|_\infty)} < \epsilon$$

where $\epsilon$ is a threshold value. If the above test is true, then the STMVP merge candidate may not be included in the merge candidate list.

Figure 17:
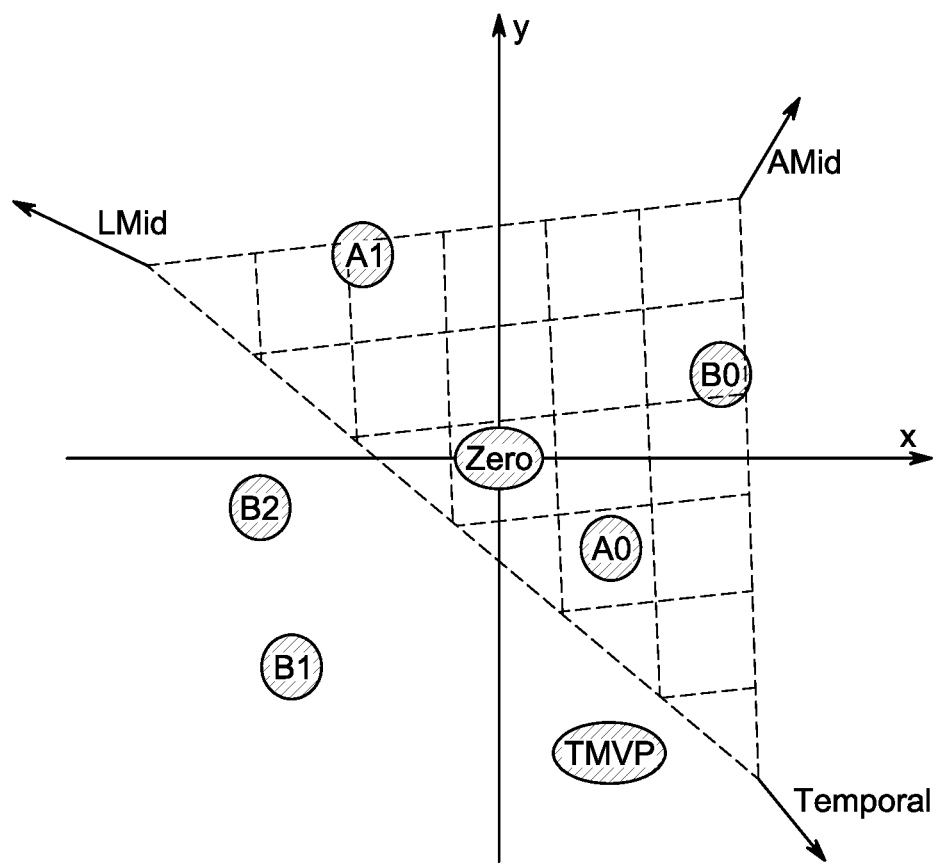
FIG. 17 illustrates an example of an embodiment for providing alternative merge candidates.

In another embodiment, STMVP merge candidates can be determined based on various approaches to combining retrieved spatial and temporal motion vectors. For example, one embodiment can involve obtaining a combination of motion vectors based on an alternative to computing or obtaining an average between the three motion vectors. For example, a combination of motion vectors can be obtained based on a weighted average between them. This can provide some MV predictor candidates that are non-redundant with classical candidates used in the usual merge mode. An example of an embodiment is illustrated in FIG. 17 which shows the classical merge candidates in a common 2D plan (the x-axis and y-axis respectively correspond to the x and y coordinates of motion vectors), in the form of labelled ellipses. Moreover, the vector $\vec{Amid}$, $\vec{Lmid}$ and $\vec{TMVP}$ are shown. The meshed area corresponds to the 2D region that can be covered by obtaining one or more combinations of the three vectors using various weighted averages of these three vectors, with positive weights. The current embodiment can comprise considering the motion vector obtained through such meshing of that 2D area to generate some more advanced STMVP merge candidates. For instance, one or more combinations of motion vectors may be obtained by proceeding through the mesh in an ordered manner and choosing the first candidate non-redundant with usual candidates, and which comply with the averaging criteria described above.

Figure 18:
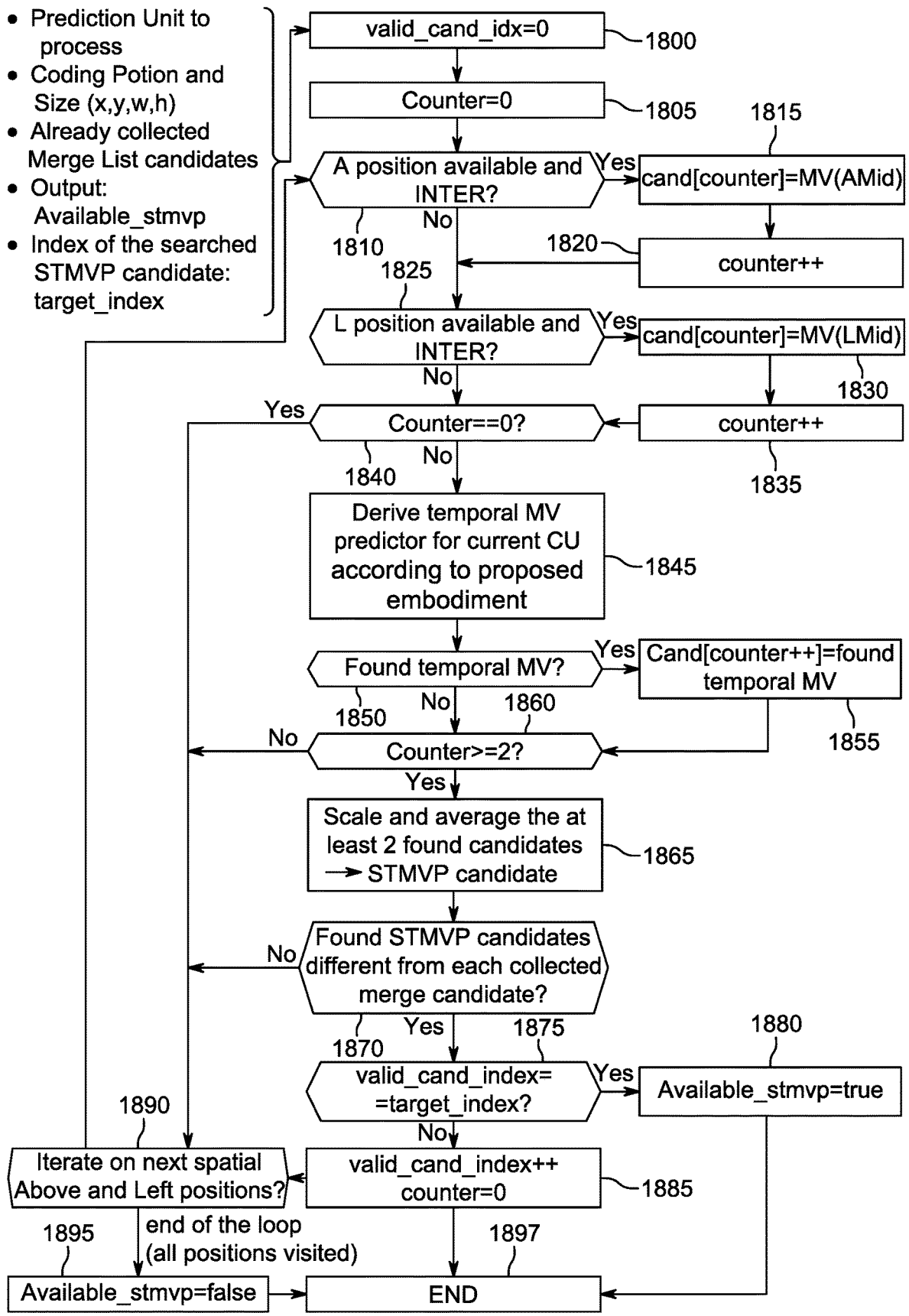
FIG. 18 provides a flow diagram illustrating an example of an embodiment for providing a non-sub-block STMVP merge candidate.

In general, at least one additional embodiment can include introducing several STMVP merge candidates into the merge list. Such multiple candidates can be obtained by considering various spatial positions around the current block, to retrieve some spatial neighboring motion vectors. To do so, the STMVP merge candidate construction process depicted in FIG. 18 can be used. The diagram depicts the embodiment of FIG. 15, modified in accordance with the present embodiment. As can be seen, a value, e.g., an input index "target_index", is given as an input to this modified process. An aspect involves searching for an STMVP merge candidate that would appear at position "target_index" in the desired ordered set of multiple non-sub-block STMVP merge candidates. A loop over multiple spatial positions around the current block can be invoked, according to a pre-defined order. Each time at least two neighboring (spatial+temporal) candidates are found, their average can be considered as a valid STMVP merge candidate. Another value can be modified, e.g., incremented, each time a valid STMVP merge candidate is identified. For example, a value such as valid_cand_index can represent the index of the current valid STMVP candidate in the desired set of STMVP candidates. When valid_cand_index is equal to target_idx, the process is over. Otherwise, the process further iterates over next spatial positions to consider to search a next STMVP candidate to provide to the overall merge candidate list.

Figure 19:
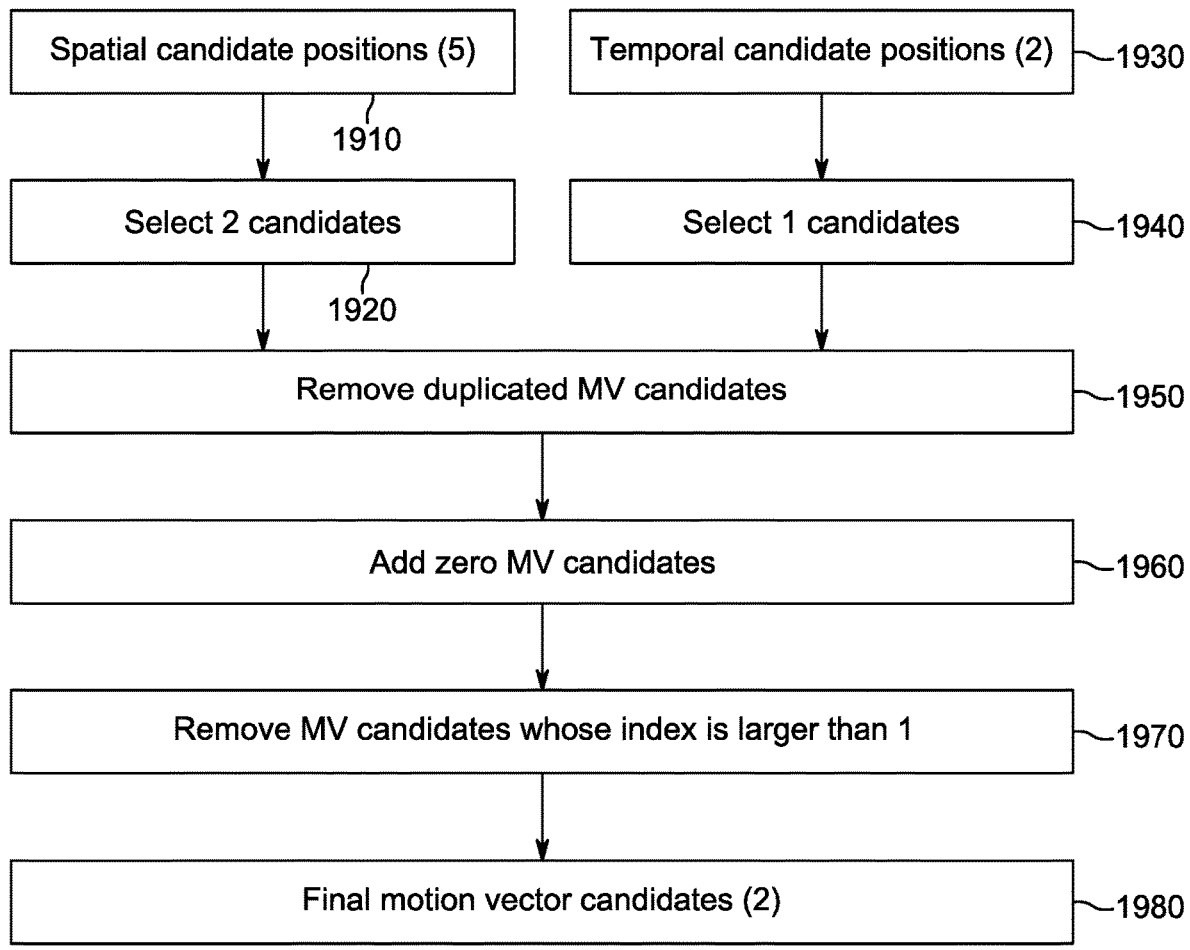
FIG. 19 provides a flow diagram illustrating an approach to AMVP candidate list construction.
Figure 20:
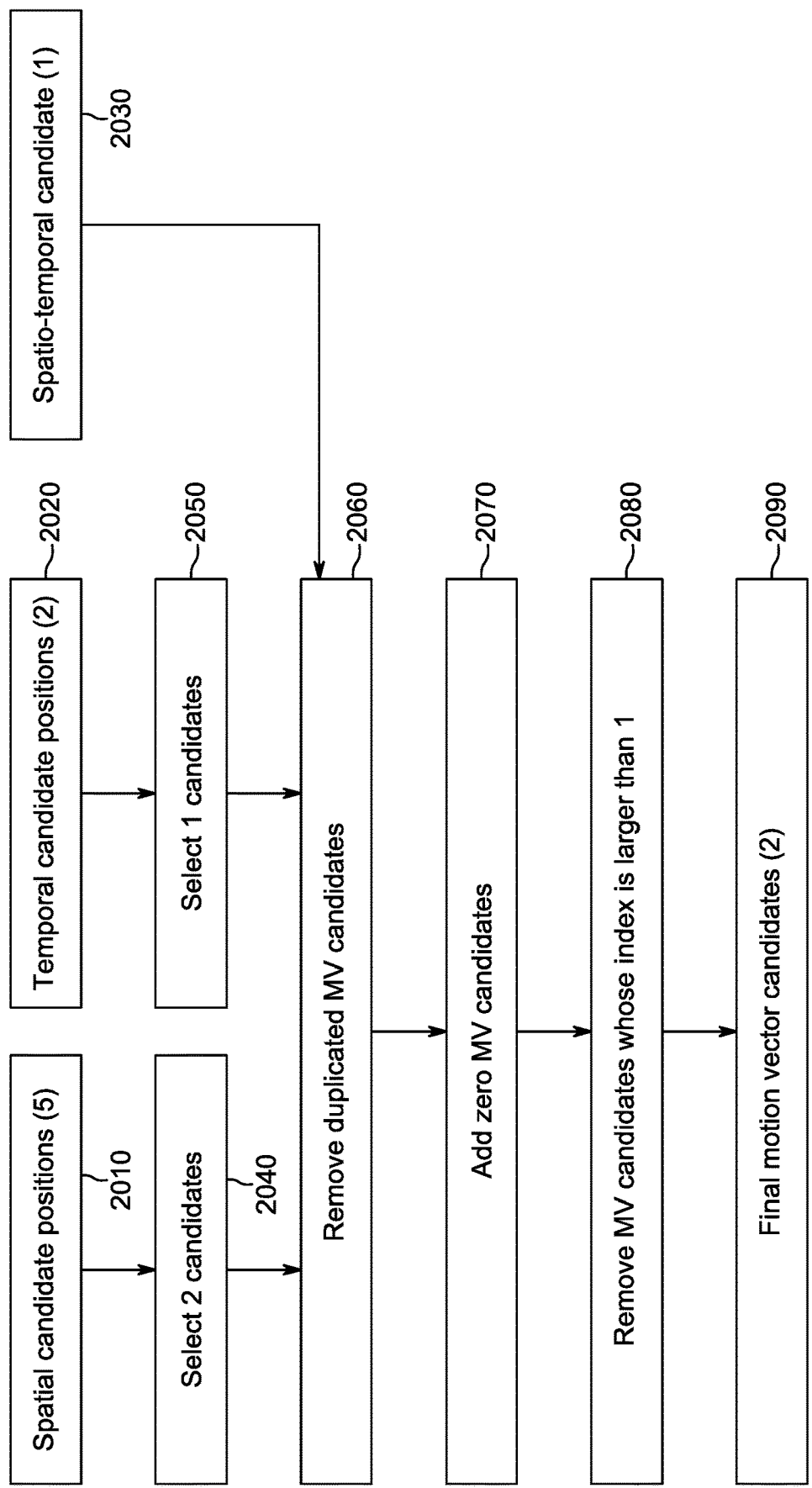
FIG. 20 provides a flow diagram illustrating an example of an embodiment of a method of determining an AMVP candidate list.

In another example of an embodiment, a spatiotemporal motion vector prediction candidate can be used in the AMVP inter prediction mode. This means, the construction of the list of AMVP motion vector predictors can integrate an additional candidate, which is the spatiotemporal candidate. This is illustrated in FIG. 20 which shows the process of FIG. 19 modified. Indeed, the process to construct the STMVP is being invoked (process of FIG. 15), and the resulting STMVP predictor, if available, can be used as an additional input to the duplicated MV removal step. In this way, if a non-complete set of AMVP candidates results from the spatial and temporal candidate retrievals, then the STMVP may be considered among the two final AMVP candidates.

In a further variant to the previous embodiments, some additional merge candidates may be computed and inserted into the merge candidate list, based on the spatial and/or temporal neighboring motion vector predictors collected in the first stages of FIG. 15.

After these spatial temporal candidates have been obtained, in the embodiment of FIG. 15, the spatiotemporal merge candidate is computed as the average of 2 or 3 motion vectors.

The present variant comprises generating one or more additional merge candidates, in the case three motion vectors are obtained in the first stages of FIG. 15.

According to a first sub-variant, the additional merge candidate is calculated as the average of the two spatial neighboring motion vectors that have been retrieved. Once the average is computed, it may be checked that it is different from each merge candidate already collected in the merge candidate list. After this (optional) unicity check, the computed average between the two spatial neighboring motion vectors is added to the merge candidate list. If the optional check mentioned above is performed, then the averaged motion vector is added to the list only if it is different from every candidate already contained in the merge list.

A second sub-variant can be performed in addition or in place of the first sub-variant above. This second sub-variant comprises computing the average motion vector between the retrieved temporal motion vector predictor and one of the two (e.g. the left) retrieved spatial motion vector predictors. Once the average is computed, it may be checked that it is different from each merge candidate already collected in the merge candidate list. After this (optional) unicity check, the computed average between the two temporal and spatial neighboring motion vectors is added to the merge candidate list. If the optional check mentioned above is performed, then the averaged motion vector is added to the list only if it is different from every MV already contained in the merge list.

According to a third sub-variant, performed in addition or in place of the first 2 sub-variants, the same process as in the second sub-variant is performed, but with the temporal motion vector predictor and the other spatial motion vector predictor (e.g. the above).

Figure 22:
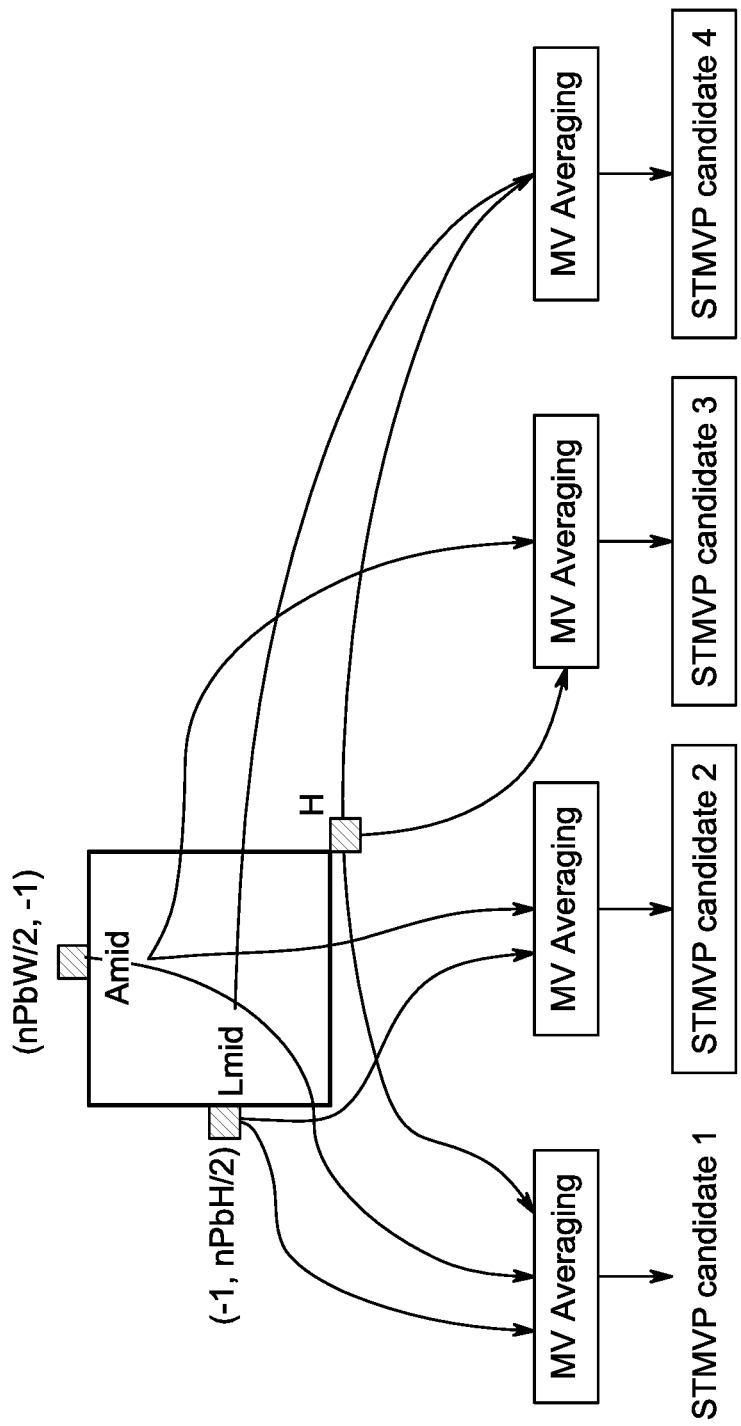
FIG. 22 illustrates another example of an embodiment.

FIG. 22 illustrates the process of this variant.

Finally, this variant takes place both on the encoder and on the decoder side, in an identical way. Moreover, as for other merge candidates, according to the merge index value of a merge CU decoded from the bit-stream, the decoder is able to detect the use of the newly added merge candidates and derive them as described above.

At least one advantage of the present variant can be further increased compression efficiency compared to the embodiment of FIG. 15.

Figure 23:
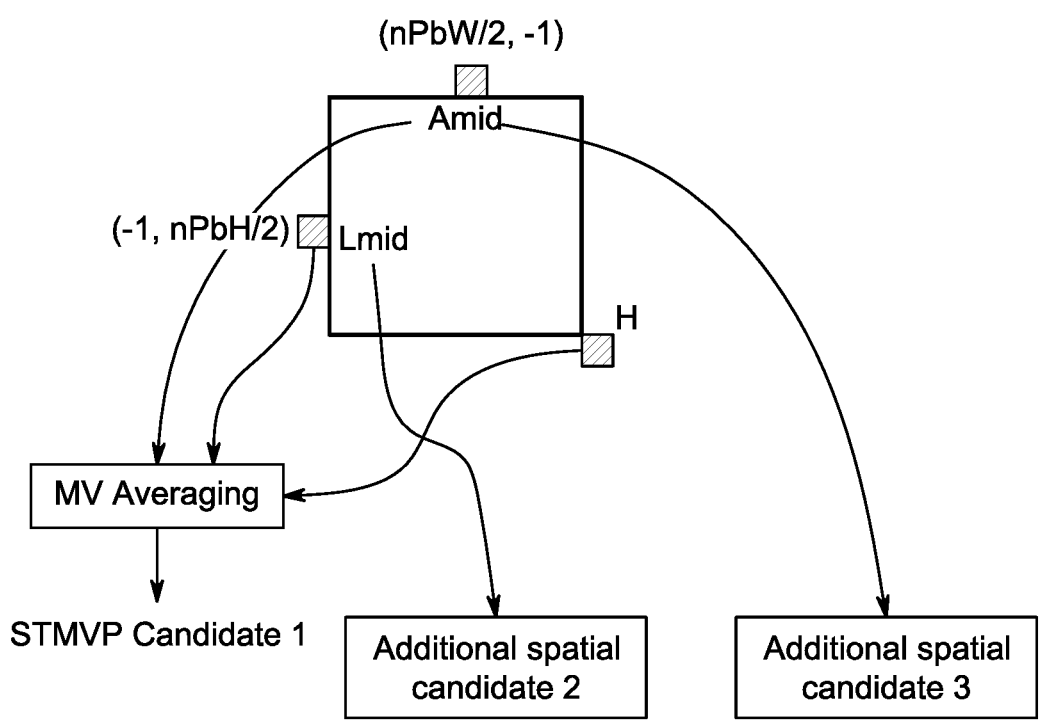
FIG. 23 illustrates another example of an embodiment.

In a further variant to the previous embodiments and previous variant, some additional merge candidates may be computed and inserted into the merge candidate list, based on the spatial neighboring motion vector predictors collected in the first stages of FIG. 15. FIG. 23 illustrates the process of this variant.

After these spatial temporal candidates have been obtained, in the first embodiment of this document, the spatiotemporal merge candidate is computed as the average of 2 or 3 motion vectors.

The present variant comprises generating 1 or 2 additional merge candidates, in the case at least one spatial neighboring motion vector has been retrieved during the first stage of FIG. 15. It proceeds as follows.

According to a first sub-variant, the first found spatial neighboring motion vector (e.g. the left one) is added to the merge candidate list as an additional merge candidate. An optional unicity check step verifies that this motion vector predictor is different from every merge candidate already present in the merge list.

According to a second sub-variant, the second found spatial neighboring motion vector (e.g. the above one) is added to the merge candidate list as an additional merge candidate. An optional unicity check step verifies that this motion vector predictor is different from every merge candidate already present in the merge list.

Consequently, up to two additional merge candidates can be pushed to the merge candidate list in this second variant.

Note this variant is only relevant in the case where the spatial position of the spatial candidates collected during the first stage of FIG. 15 are different from the spatial position already existing in the merge candidates used in the considered video codec. In practice, if the spatial candidates used to compute the STMVP candidate are the Amid and Lmid candidates of FIG. 12, then the present variant can take place.

Also, this variant takes place both on the encoder and on the decoder side, in an identical way. Moreover, as for other merge candidates, according to the merge index value of a merge CU decoded from the bit-stream, the decoder is able to detect the use of the newly added merge candidates and derive them as described above.

An advantage of the present variant can be further increased compression efficiency.

This present variant can be used in combination with the previous variant.

According to a variant of any embodiment described herein, the scaling step applied on the spatial neighboring motion vector predictors used to generate the spatial-temporal merge candidate might not be applied. Therefore, this motion vector scaling step can be removed from the processes of FIG. 15 or FIG. 18 or can be selectively removed or selectively enabled. This enables reducing the complexity of the process used to compute the spatial temporal motion vector predictor(s).

According to a further variant, when the scaling of spatial MV predictors is not applied, then the following process may be applied so as to optimize the overall coding efficiency of the considered video codec.

Figure 24:
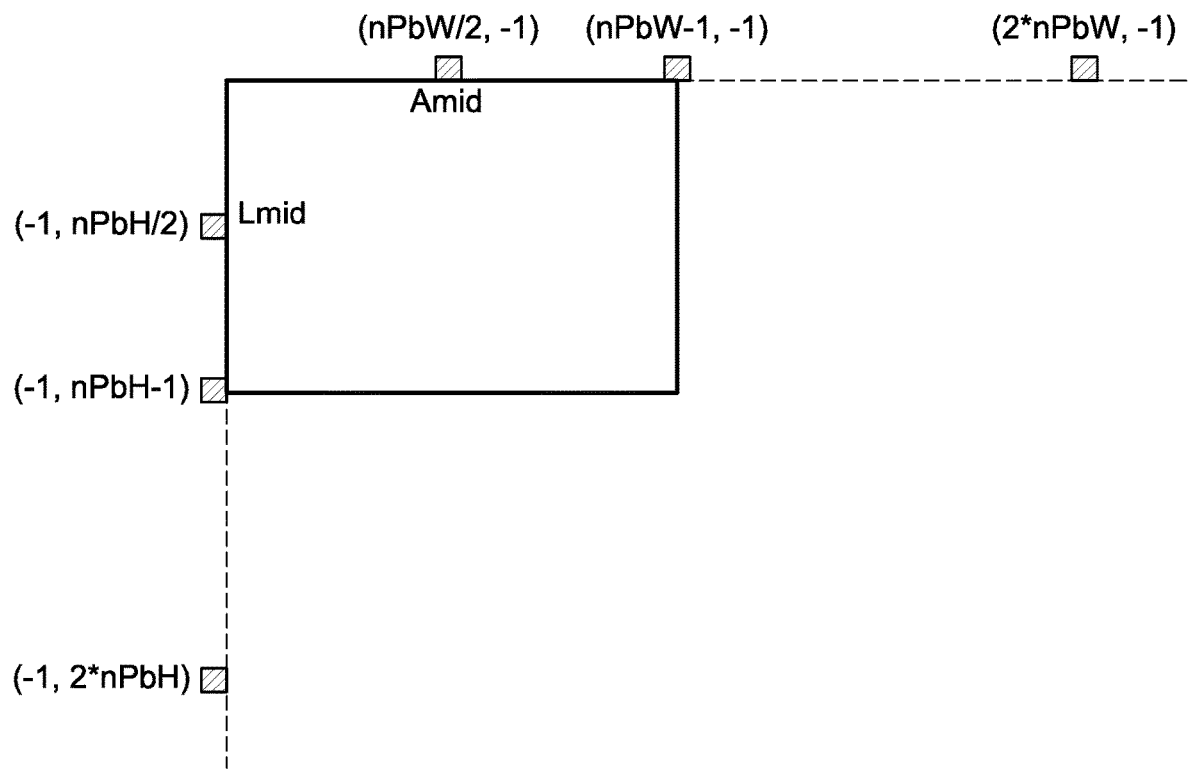
FIG. 24 illustrates another example of an embodiment.

The basic principle of this variant is to select a pair of spatial MV predictors as a function of their respective reference picture indices. The process comprises at least two characteristics. First, a top and a left neighboring motion vector of current CU are searched, among multiple spatial positions. FIG. 24 illustrates the spatial positions that are considered, respectively, for the top and left neighboring motion vector predictors. Second, the first found pair of motion vector predictors that satisfy a constraint or condition put onto the reference picture indices is selected and used to compute the STMVP motion vector predictor without any spatial MV predictor scaling.

Examples of the constraint or condition put onto the reference picture indice(s) of the spatial MV predictor candidates may comprise one the following exemplary constraints.

A pair of spatial MV candidates may be selected if, in each of its reference picture lists used by the considered spatial MV candidate (list L0, L1 or both), the reference picture index is equal to 0.

According to another exemplary constraint on the reference picture indices, a pair of spatial MV candidates may be selected if, in each of its reference picture lists used commonly by the two considered spatial MV candidates (list L0, L1 or both), the reference picture indices of the two candidates are equal. Additionally, in this last variant, if the reference picture indices of the two spatial candidates are equal to each other and are equal to zero, then the temporal MV predictor is used to generate the final spatial temporal MV predictor. If they are equal to each other but not equal to zero, then the temporal MV predictor can be used to generate the averaged spatial temporal MV predictor.

According to a further embodiment, the variant of FIG. 24 may be combined with the embodiment of FIG. 22. This means, after selecting a pair of spatial MV predictor candidates according to their reference picture indices, if the STMVP merge candidate is computed with three motion vectors, then some additional STMVP candidates may be computed and added to the merge candidate list, according to the process of FIG. 22.

According to another embodiment, when seeking a pair of spatial MV candidates as shown on FIG. 24, some spatial candidates different from the spatial neighboring MV of current block may be considered. For example, some vector stored in a so-called history-based motion vector predictor (e.g., HMVP as known in the art) buffer may be considered as candidate motion vector predictors. Then, the constraint onto their reference picture indices may be used to select the MV predictor to use for the computation of the spatial temporal motion vector predictor.

HMVP basically involves storing the motion vectors used to code/decode successive blocks in a given picture, slice, tile or tile group, in a FIFO (First In First Out) buffer, and re-use them later to predict the motion vector(s) used to code subsequent block in the considered picture/slice/tile/tile-group.

According to a further embodiment, multiple spatial temporal motion vector candidates may be searched a computed with two spatial and one temporal motion vector predictors. To do so, several different pairs of spatial motion vector predictors may be sought around the current block or in the HMVP buffer. Furthermore, the above-mentioned constraint on the reference picture indices of candidate motion vectors may be used to select the several different pairs of spatial motion vector candidates.

According to another embodiment, including a spatial temporal motion vector predictor into the merge candidate list may be decided according to the merge list size at the time the STMVP candidate is being considered, relative to the maximum allowed merge list size. As an example, if at least two free places are remaining in the merge list under construction, then including a spatial temporal motion vector candidate may be permitted or enabled, otherwise not.

According to another embodiment, the merge candidate list may be ordered in such way that the spatial temporal motion vector predictor(s) are inserted in the merge candidate list before the HMVP candidates.

According to another approach, the spatial temporal motion vector candidate(s) may be put after the HMVP candidates in the merge candidate list.

According to another embodiment, the spatial temporal MV predictor(s) may be interleaved with the HMVP candidates in the merge candidate list. For example, one STMVP candidate may be put first, then an HMVP candidate, then another STMVP candidate and so on. Alternatively, a HMVP candidate may appear first, then the STMVP candidate(s), then some other HMVP candidates.

According to another embodiment, the STMVP candidates may be interleaved with candidates referred to as pairwise-average candidates. The pairwise-average candidates include a set of averaged motion vectors between motion vector already present in the merge candidate list under construction. In case the STMVP candidates are interleaved with the pairwise candidates, then they may be computed as the average of non-temporal MV candidates present in the pairwise candidates, and the temporal motion vector predictor (TMVP) associated to the block being coded/decoded. Then, in this embodiment, one pairwise candidate may appear first in the list, then an STMVP candidate, then a pairwise candidate and so on. Alternatively, the STMVP candidate computed based on the first pairwise candidate may appear first in the list, the pairwise candidate, then the STMVP candidate computed based on the second pairwise candidate, and so on.

According to at least one other embodiment, if the pairwise average candidates and STMVP candidates are all used to construct the merge list, then the process used to construct the pairwise average candidates based on candidates already present in the list may exclude the STMVP candidate(s) from its construction process, if some STMVP candidate(s) are already present in the merge under construction.

According to a further embodiment, a high level syntax element, such as a slice header, tile group header, tile header or picture header syntax element, e.g., comprising a flag, indicates if the STMVP candidate(s) is used to construct the merge candidate list of each CU coded or decoded in merge mode in the considered slice, tile group, tile or picture.

According to an embodiment, the value of this flag is decided on the encoder side, in order to optimize the coding efficiency.

According to an embodiment, the value of the flag is decided as a function of the temporal layer the current slice, tile, tile group or picture is belonging to. As an example, if the slice, tile, tile group or picture is in the temporal layer 0, then the flag may be chosen as 0 (false). Otherwise it may be chosen as 1 (true).

According to an embodiment, the value of the flag is decided as a function of the set of reference pictures available and that can be used for the temporal prediction of the current slice, tile, tile group or picture. As an example, if the slice, tile, tile group or picture has at least one reference picture with a POC value lower than the current POC and at least one reference picture with a POC value higher than current POC, then the flag may be chosen as 1 (true). Otherwise it may be chosen as 0 (false).

As another example, if reference pictures with reference picture index 0 in each reference picture list L0 and L1 have respective a POC lower and higher than the POC of current slice, tile, tile group or picture, then the flag may be chosen as 1 (true). Otherwise it may be chosen as 0 (false).

According to an embodiment, the value of the flag is decided on the encoder side, as a function of the intra period of the sequence being coded.

As an example, if the intra period is an integer value strictly higher than zero, then the flag may be chosen as 1 (true). Otherwise it may be chosen as 0 (false).

On the decoder side, the flag is parsed in the slice, tile, tile group or picture header (picture parameter set). Then, when decoding each coding unit in the considered slice, tile, tile group or picture, the value of the flag is taken into account in order to include the spatial temporal (STMVP) candidate(s) during the construction of the merge candidate list of a given CU being decoded in merge mode.

According to a further embodiment, a high level syntax element, such as a slice header, tile group header, tile header or picture header syntax element, consisting in a flag, indicates information related to the position of the STMVP candidate(s) in the merge candidate list, when constructing the merge candidate list of each CU coded or decoded in merge mode in the considered slice, tile group, tile or picture.

As an example, according to a given value (e.g. 1 or true) of this flag, the STMVP candidate is located right after the fourth spatial merge candidate in the merge list. Hence, in this approach the merge list would consists in the following ordered set of merge candidates:
First spatial candidate: left, noted A1
Second spatial candidate: above, noted B1
Third spatial candidate: above right, noted B0
Fourth spatial candidate: left bottom, noted A0
Proposed STMVP candidate
Fifth spatial candidate: above left, noted B2
Temporal motion vector prediction candidate, noted TMVP History-based motion vector prediction candidate, noted HMVP
Pairwise average candidates
Zero motion vectors If the flag value is 0 (false), then the STMVP candidate position is behind the temporal motion vector predictor (TMVP), and the merge candidate list is ordered as follows:
First spatial candidate: left, noted A1
Second spatial candidate: above, noted B1
Third spatial candidate: above right, noted B0
Fourth spatial candidate: left bottom, noted A0
Fifth spatial candidate: above left, noted B2
Temporal motion vector prediction candidate, noted TMVP
Proposed STMVP candidate
History-based motion vector prediction candidate, noted HMVP
Pairwise average candidates
Zero motion vectors According to an embodiment, the value of this flag is decided on the encoder side, in order to optimize the coding efficiency.

According to an embodiment, the value of the flag is decided as a function of the temporal layer the current slice, tile, tile group or picture is belonging to. As an example, if the slice, tile, tile group or picture is in the temporal layer 0, then the flag may be chosen as 0 (false). Otherwise it may be chosen as 1 (true).

According to an embodiment, the value of the flag is decided as a function of the set of reference pictures available and that can be used for the temporal prediction of the current slice, tile, tile group or picture. As an example, if the slice, tile, tile group or picture has at least one reference picture with a POC value lower than the current POC and at least one reference picture with a POC value higher than current POC, then the flag may be chosen as 1 (true). Otherwise it may be chosen as 0 (false).

As another example, if reference pictures with reference picture index 0 in each reference picture list L0 and L1 have respective a POC lower and higher than the POC of current slice, tile, tile group or picture, then the flag may be chosen as 1 (true). Otherwise it may be chosen as 0 (false).

According to an embodiment, the value of the flag is decided on the encoder side, as a function of the intra period of the sequence being coded.

As an example, if the intra period is an integer value strictly higher than zero, then the flag may be chosen as 1 (true). Otherwise it may be chosen as 0 (false).

On the decoder side, the flag is parsed in the slice, tile, tile group or picture header (picture parameter set). Then, when decoding each coding unit in the considered slice, tile, tile group or picture, the value of the flag is taken into account in order to adjust the ordering of merge candidates in the merge candidate list as described above, when constructing the merge candidate list of a coding unit being decoded in merge mode.

According to another embodiment, the choice between the two above orderings of the merge candidate is made both on the encoder and on the decoder side in a synchronous way. In this embodiment, any of the above strategies may be applied on the decoder side, exactly the same way as on the encoder side.

According to another embodiment, the temporal motion vector predictor (TMVP) is put at a position closer to the head of the merge candidate list. As an example, the position of the TMVP candidate may be behind the first four spatial candidates and before the fifth spatial candidate B2, in the merge lists illustrated above.

According to a further embodiment, which may be combined with the last one, the STMVP candidate is put just after the TMVP candidate in the merge candidate list.

According to another embodiment, the two spatial motion vector predictors used to compute the STMVP merge candidate are selected according to one of the following ways.

The first spatial MV predictor may be set equal to the first spatial candidate already present in the merge list, and the second MV predictor may be set equal to the last spatial candidate inserted in the merge list under construction, at the time the STMVP candidate is being computed.

The first spatial MV predictor may be set equal to one of the three spatial candidates found above the current CU, i.e. B0, B1 or B2. It may be set equal to the first found spatial predictor above the current CU, if found. In this variant, the second spatial MV predictor used to compute the STMVP candidate may be set equal to one of the spatial candidates found on the left of current CU, i.e. among A0 and A1. For instance, it may be set equal to the first found spatial MV predictor on the left of the current CU. In the present variant, if no above spatial MV predictor or no left spatial MV predictor is found, then the two spatial MV predictor may be chosen as the first and the second ones in the merge list under construction, or as the first and the last spatial MV predictors in the merge list under construction.

This document describes various examples of embodiments, features, models, approaches, etc. Many such examples are described with specificity and, at least to show the individual characteristics, are often described in a manner that may appear limiting. However, this is for purposes of clarity in description, and does not limit the application or scope. Indeed, the various examples of embodiments, features, etc., described herein can be combined and interchanged in various ways to provide further examples of embodiments.

Examples of embodiments in accordance with the present disclosure include but are not limited to the following.

In general, at least one example of an embodiment can involve an apparatus for encoding video data, comprising one or more processors, wherein the one or more processors are configured for: determining at least two motion vectors are available among first or second spatial motion vectors associated with respective first and second spatial locations neighboring a current block or a temporal motion vector co-located with a third spatial location neighboring the current block, wherein the first spatial location is neighboring to the left of the current block and the second spatial location is neighboring above the current block; obtaining a first spatiotemporal motion vector prediction candidate based on a combination of the at least two motion vectors available among the first or second spatial motion vectors or the temporal motion vector; and obtaining a second spatiotemporal motion vector prediction candidate based on all three of the first and second spatial motion vectors and the temporal motion vector being available and based on one of a plurality of combinations of the three available motion vectors comprising: a) a first combination of the first and second spatial motion vectors; or b) a second combination of the first spatial motion vector and the temporal motion vector; or c) a third combination of the second spatial motion vector and the temporal motion vector, wherein the one of the plurality of combinations on which obtaining the second spatiotemporal motion vector is based is different from the combination of the at least two motion vectors on which obtaining the first spatiotemporal motion vector is based; and encoding the video data to produce encoded video data based on at least one of the first and second spatiotemporal motion vector prediction candidates.

In general, at least one other example of an embodiment can involve a method for encoding video data, comprising determining at least two motion vectors are available among first or second spatial motion vectors associated with respective first and second spatial locations neighboring a current block or a temporal motion vector co-located with a third spatial location neighboring the current block, wherein the first spatial location is neighboring to the left of the current block and the second spatial location is neighboring above the current block; obtaining a first spatiotemporal motion vector prediction candidate based on a combination of the at least two motion vectors available among the first or second spatial motion vectors or the temporal motion vector; and obtaining a second spatiotemporal motion vector prediction candidate based on all three of the first and second spatial motion vectors and the temporal motion vector being available and based on one of a plurality of combinations of the three available motion vectors comprising: a) a first combination of the first and second spatial motion vectors; or b) a second combination of the first spatial motion vector and the temporal motion vector; or c) a third combination of the second spatial motion vector and the temporal motion vector, wherein the one of the plurality of combinations on which obtaining the second spatiotemporal motion vector is based is different from the combination of the at least two motion vectors on which obtaining the first spatiotemporal motion vector is based; and encoding the video data to produce encoded video data based on at least one of the first and second spatiotemporal motion vector prediction candidates.

In general, at least one other example of an embodiment can involve an apparatus for decoding video data, comprising one or more processors, wherein the one or more processors are configured for: determining at least two motion vectors are available among first or second spatial motion vectors associated with respective first and second spatial locations neighboring a current block or a temporal motion vector co-located with a third spatial location neighboring the current block, wherein the first spatial location is neighboring to the left of the current block and the second spatial location is neighboring above the current block; obtaining a first spatiotemporal motion vector prediction candidate based on a combination of the at least two motion vectors available among the first or second spatial motion vectors or the temporal motion vector; and obtaining a second spatiotemporal motion vector prediction candidate based on all three of the first and second spatial motion vectors and the temporal motion vector being available and based on one of a plurality of combinations of the three available motion vectors comprising: a) a first combination of the first and second spatial motion vectors; or b) a second combination of the first spatial motion vector and the temporal motion vector; or c) a third combination of the second spatial motion vector and the temporal motion vector, wherein the one of the plurality of combinations on which obtaining the second spatiotemporal motion vector is based is different from the combination of the at least two motion vectors on which obtaining the first spatiotemporal motion vector is based; and decoding the video data to produce decoded video data based on at least one of the first and second spatiotemporal motion vector prediction candidates.

In general, at least one other example of an embodiment can involve a method for decoding video data, comprising determining at least two motion vectors are available among first or second spatial motion vectors associated with respective first and second spatial locations neighboring a current block or a temporal motion vector co-located with a third spatial location neighboring the current block, wherein the first spatial location is neighboring to the left of the current block and the second spatial location is neighboring above the current block; obtaining a first spatiotemporal motion vector prediction candidate based on a combination of the at least two motion vectors available among the first or second spatial motion vectors or the temporal motion vector; and obtaining a second spatiotemporal motion vector prediction candidate based on all three of the first and second spatial motion vectors and the temporal motion vector being available and based on one of a plurality of combinations of the three available motion vectors comprising: a) a first combination of the first and second spatial motion vectors; or b) a second combination of the first spatial motion vector and the temporal motion vector; or c) a third combination of the second spatial motion vector and the temporal motion vector, wherein the one of the plurality of combinations on which obtaining the second spatiotemporal motion vector is based is different from the combination of the at least two motion vectors on which obtaining the first spatiotemporal motion vector is based; and decoding the video data to produce decoded video data based on at least one of the first and second spatiotemporal motion vector prediction candidates.

In general, at least one other example of an embodiment can involve an apparatus or method as described above, wherein the one or more processors are further configured for, or the method further comprises obtaining a third spatiotemporal motion vector prediction candidate based on a second one of the plurality of combinations, wherein the second one of the plurality of combinations is different from both the combination on which obtaining the first spatiotemporal motion vector prediction candidate is based and the one of the plurality of combinations on which obtaining the second spatiotemporal motion vector prediction candidate is based.

In general, at least one other example of an embodiment can involve an apparatus or method as described above, wherein the one or more processors are further configured for, or the method further comprises either applying scaling to one or more spatial motion vectors being averaged, or if scaling is not applied then the determining includes: selecting a pair of spatial motion vector predictors based on respective reference picture indices, wherein the selecting comprises searching multiple neighboring spatial positions for a top and a left neighboring motion vector of current CU that satisfy a condition put onto the reference picture indices; and obtaining the spatiotemporal motion vector predictor based on the selected pair of spatial motion vector predictors.

In general, at least one other example of an embodiment can involve an apparatus or method as described above, wherein the one or more processors are further configured for, or the method further comprises either applying scaling to one or more spatial motion vectors being averaged, or if scaling is not applied then the determining includes selecting a pair of spatial motion vector predictors from a history-based motion vector predictor buffer, based on respective reference picture indices that satisfy a condition put onto the reference picture indices; and obtaining the spatiotemporal motion vector predictor based on the selected pair of spatial motion vector predictors.

In general, at least one other example of an embodiment can involve an apparatus or method involving a condition as described above, wherein the condition comprises: a pair of spatial motion vector candidates may be selected if, in each reference picture list used by the considered spatial motion vector candidate, the reference picture index is equal to 0; or a pair of spatial motion vector candidates may be selected if, in each reference picture list used by both spatial motion vector candidates, the reference picture indices of the two candidates are equal; or if the reference picture indices of the two spatial candidates are equal to each other and are equal to zero, then the spatiotemporal motion vector predictor is obtained based on the temporal motion vector predictor; or if the reference picture indices of the two spatial candidates are equal to each other but not equal to zero, then the averaged spatiotemporal motion vector predictor is obtained based on the temporal motion vector predictor.

In general, at least one other example of an embodiment can involve an apparatus for encoding video data, comprising one or more processors, wherein the one or more processors are configured for: obtaining a first spatiotemporal motion vector prediction candidate based on at least two motion vectors being available among first or second spatial motion vectors associated with respective first and second spatial locations neighboring a current block, and a temporal motion vector co-located with a third spatial location associated with the current block, wherein the first spatial location is neighboring to the left of the current block and the second spatial location is neighboring above the current block, and based on a combination of the at least two motion vectors that are available; modifying a first value based on the first spatiotemporal motion vector prediction candidate being obtained; obtaining a second spatiotemporal motion vector prediction candidate based on the first value having a relationship to a second value representing a position in an ordered set of non-sub-block spatiotemporal motion vector prediction candidates, and based on at least two motion vectors being available among third or fourth spatial motion vectors or the temporal motion vector, wherein the third and fourth spatial motion vectors are associated with fifth and sixth spatial locations different from the first and second spatial locations, and wherein the fifth spatial location is neighboring to the left of the current block and the sixth spatial location is neighboring above the current block; including at least one of the first and second spatiotemporal motion vector prediction candidates in the ordered set of non-sub-block spatiotemporal motion vector prediction candidates; and encoding the video data to produce encoded video data based on the at least one of the first and second spatiotemporal motion vector prediction candidates.

In general, at least one other example of an embodiment can involve a method for encoding video data, comprising obtaining a first spatiotemporal motion vector prediction candidate based on at least two motion vectors being available among first or second spatial motion vectors associated with respective first and second spatial locations neighboring a current block, and a temporal motion vector co-located with a third spatial location associated with the current block, wherein the first spatial location is neighboring to the left of the current block and the second spatial location is neighboring above the current block, and based on a combination of the at least two motion vectors that are available;

modifying a first value based on the first spatiotemporal motion vector prediction candidate being obtained; obtaining a second spatiotemporal motion vector prediction candidate based on the first value having a relationship to a second value representing a position in an ordered set of non-sub-block spatiotemporal motion vector prediction candidates, and based on at least two motion vectors being available among third or fourth spatial motion vectors or the temporal motion vector, wherein the third and fourth spatial motion vectors are associated with fifth and sixth spatial locations different from the first and second spatial locations, and wherein the fifth spatial location is neighboring to the left of the current block and the sixth spatial location is neighboring above the current block; including at least one of the first and second spatiotemporal motion vector prediction candidates in the ordered set of non-sub-block spatiotemporal motion vector prediction candidates; and encoding the video data to produce encoded video data based on the at least one of the first and second spatiotemporal motion vector prediction candidates.

In general, at least one other example of an embodiment can involve one or more processors, wherein the one or more processors are configured for obtaining a first spatiotemporal motion vector prediction candidate based on at least two motion vectors being available among first or second spatial motion vectors associated with respective first and second spatial locations neighboring a current block, and a temporal motion vector co-located with a third spatial location associated with the current block, wherein the first spatial location is neighboring to the left of the current block and the second spatial location is neighboring above the current block, and based on a combination of the at least two motion vectors that are available; modifying a first value based on the first spatiotemporal motion vector prediction candidate being obtained; obtaining a second spatiotemporal motion vector prediction candidate based on the first value having a relationship to a second value representing a position in an ordered set of non-sub-block spatiotemporal motion vector prediction candidates, and based on at least two motion vectors being available among third or fourth spatial motion vectors or the temporal motion vector, wherein the third and fourth spatial motion vectors are associated with fifth and sixth spatial locations different from the first and second spatial locations, and wherein the fifth spatial location is neighboring to the left of the current block and the sixth spatial location is neighboring above the current block; including at least one of the first and second spatiotemporal motion vector prediction candidates in the ordered set of non-sub-block spatiotemporal motion vector prediction candidates; and decoding the video data to produce decoded video data based on the at least one of the first and second spatiotemporal motion vector prediction candidates.

In general, at least one other example of an embodiment can involve a method for decoding video data, comprising obtaining a first spatiotemporal motion vector prediction candidate based on at least two motion vectors being available among first or second spatial motion vectors associated with respective first and second spatial locations neighboring a current block, and a temporal motion vector co-located with a third spatial location associated with the current block, wherein the first spatial location is neighboring to the left of the current block and the second spatial location is neighboring above the current block, and based on a combination of the at least two motion vectors that are available; modifying a first value based on the first spatiotemporal motion vector prediction candidate being obtained; obtaining a second spatiotemporal motion vector prediction candidate based on the first value having a relationship to a second value representing a position in an ordered set of non-sub-block spatiotemporal motion vector prediction candidates, and based on at least two motion vectors being available among third or fourth spatial motion vectors or the temporal motion vector, wherein the third and fourth spatial motion vectors are associated with fifth and sixth spatial locations different from the first and second spatial locations, and wherein the fifth spatial location is neighboring to the left of the current block and the sixth spatial location is neighboring above the current block; including at least one of the first and second spatiotemporal motion vector prediction candidates in the ordered set of non-sub-block spatiotemporal motion vector prediction candidates; and decoding the video data to produce decoded video data based on the at least one of the first and second spatiotemporal motion vector prediction candidates.

In general, at least one other example of an embodiment can involve an apparatus for encoding video data, comprising one or more processors, wherein the one or more processors are configured for determining at least two motion vectors are available among first or second spatial motion vectors associated with respective first and second spatial locations neighboring a current block and a temporal motion vector co-located with a third spatial location neighboring to the right and adjacent to a bottom right corner of the current block, wherein the first spatial location is neighboring to the left of the current block and the second spatial location is neighboring above the current block; obtaining a spatiotemporal motion vector prediction candidate based on at least two motion vectors being available among the first and second spatial motion vectors and the temporal motion vector, and based on a combination of the at least two motion vectors that are available; and encoding the video data to produce encoded video data based on the spatiotemporal motion vector prediction candidate.

In general, at least one other example of an embodiment can involve a method for encoding video data, comprising determining at least two motion vectors are available among first or second spatial motion vectors associated with respective first and second spatial locations neighboring a current block and a temporal motion vector co-located with a third spatial location neighboring to the right and adjacent to a bottom right corner of the current block, wherein the first spatial location is neighboring to the left of the current block and the second spatial location is neighboring above the current block; obtaining a spatiotemporal motion vector prediction candidate based on at least two motion vectors being available among the first and second spatial motion vectors and the temporal motion vector, and based on a combination of the at least two motion vectors that are available; and encoding the video data to produce encoded video data based on the spatiotemporal motion vector prediction candidate.

In general, at least one other example of an embodiment can involve apparatus for decoding video data, comprising one or more processors, wherein the one or more processors are configured for determining at least two motion vectors are available among first or second spatial motion vectors associated with respective first and second spatial locations neighboring a current block and a temporal motion vector co-located with a third spatial location neighboring to the right and adjacent to a bottom right corner of the current block, wherein the first spatial location is neighboring to the left of the current block and the second spatial location is neighboring above the current block; obtaining a spatiotemporal motion vector prediction candidate based on at least two motion vectors being available among the first and second spatial motion vectors and the temporal motion vector, and based on a combination of the at least two motion vectors that are available; and decoding the video data to produce decoded video data based on the spatiotemporal motion vector prediction candidate.

In general, at least one other example of an embodiment can involve a method for decoding video data, comprising determining if at least two motion vectors are available among first or second spatial motion vectors associated with respective first and second spatial locations neighboring a current block and a temporal motion vector co-located with a third spatial location neighboring to the right and adjacent to a bottom right corner of the current block, wherein the first spatial location is neighboring to the left of the current block and the second spatial location is neighboring above the current block; obtaining a spatiotemporal motion vector prediction candidate based on at least two motion vectors being available among the first and second spatial motion vectors and the temporal motion vector, and based on a combination of the at least two motion vectors that are available; and decoding the video data to produce decoded video data based on the spatiotemporal motion vector prediction candidate.

In general, at least one other example of an embodiment can involve any example of an embodiment of an apparatus or method as described herein, further comprising determining whether to add at least one obtained spatiotemporal motion vector prediction candidate to a merge candidate list based on a criterion indicating a relevance of the spatiotemporal motion vector prediction candidate.

In general, at least one other example of an embodiment can involve an apparatus or method as described above, wherein the criterion comprises determining if a $L_\infty$ norm of a result of the averaging is negligible compared to the $L_\infty$ norm of each of the at least two motion vectors on which the obtaining of the at least one spatiotemporal motion vector is based. In general, at least one other example of an embodiment can involve an apparatus or method as described above, wherein determining whether to add at least one obtained spatiotemporal motion vector prediction candidate to the merge candidate list comprises determining whether the at least one spatiotemporal motion vector prediction candidate is redundant to any other candidate in the merge candidate list, and adding the at least one spatiotemporal motion vector prediction candidate to the merge candidate list only if the at least one spatiotemporal motion vector prediction candidate is not redundant.

In general, at least one other example of an embodiment can involve an apparatus or method as described above, wherein determining whether to include at least one obtained spatiotemporal motion vector prediction candidate in the merge candidate list is based on a size of the merge candidate list at a time the at least one obtained spatiotemporal motion vector predictor candidates is being considered relative to a maximum allowed size of the merge candidate list.

In general, at least one other example of an embodiment can involve an apparatus or method as described above, wherein the at least one obtained spatiotemporal motion vector prediction candidate is included in the merge candidate list based on an ordering of candidates included in the list, wherein the ordering comprises one of placing the at least one obtained spatiotemporal motion vector prediction candidate at a fourth position in the list; or placing the at least one obtained spatiotemporal motion vector prediction candidate at a position in the list determined based on a position of an alternative temporal motion vector prediction candidate; or placing the at least one obtained spatiotemporal motion vector prediction candidate in the list at a position providing a priority higher than all candidates in the list except for an alternative temporal motion vector prediction candidate and a left-neighboring candidate and an above-neighboring candidate; or placing the at least one obtained spatiotemporal motion vector prediction candidate before or after history-based motion vector prediction candidates included in the list; or interleaving the at least one obtained spatiotemporal motion vector prediction candidate with history-based motion vector prediction candidates included in the list; or interleaving the at least one obtained spatiotemporal motion vector prediction candidate with one or more pairwise average candidates included in the list.

In general, at least one other example of an embodiment can involve any example of an embodiment of an apparatus or method as described herein, wherein the combination or one or more of the plurality of combinations are obtained based on an average of available motion vectors.

In general, at least one other example of an embodiment can involve an apparatus or method as described above involving an average, wherein the average comprises a weighted average.

In general, at least one other example of an embodiment can involve an apparatus or method as described above involving a weighted average, wherein the weighted average comprises a plurality of weighted averages, each of the plurality of weighted averages being based on a respective one of a plurality of weightings.

In general, at least one other example of an embodiment can involve any example of an embodiment of an apparatus or method as described herein, wherein the first and second spatial locations correspond to a middle position along a top edge of the current block and a middle position along a left edge of the current block, respectively.

In general, at least one other example of an embodiment can involve any example of an embodiment of an apparatus or method as described herein, wherein one or more obtained spatiotemporal motion vector prediction candidates is used in an adaptive motion vector prediction mode of operation.

In general, at least one other example of an embodiment can involve a computer program product comprising computing instructions for performing any example of an embodiment of a method as described herein when executed by one of more processors.

In general, at least one other example of an embodiment can involve a bitstream, formatted to include encoded video data, wherein the encoded video data include an indicator associated with obtaining a spatiotemporal motion vector prediction candidate according to any example of a method of encoding video data as described herein; and picture data encoded based on the spatiotemporal motion vector prediction candidate.

In general, at least one other example of an embodiment can involve a device comprising an apparatus according to any example of an embodiment as described herein; and at least one of (i) an antenna configured to receive a signal, the signal including data representative of the video data, (ii) a band limiter configured to limit the received signal to a band of frequencies that includes the data representative of the video data, and (iii) a display configured to display an image from the video data.

In general, the examples of embodiments described and contemplated in this document can be implemented in many different forms. FIGS. 1 and 2 described above and FIG. 21 described below provide some embodiments, but other embodiments are contemplated and the discussion of FIGS. 1, 2 and 21 does not limit the breadth of the implementations. At least one embodiment generally provides an example related to video encoding and/or decoding, and at least one other embodiment generally relates to transmitting a bitstream or signal generated or encoded. These and other embodiments can be implemented as a method, an apparatus, a computer readable storage medium having stored thereon instructions for encoding or decoding video data according to any of the methods described, and/or a computer readable storage medium having stored thereon a bitstream or signal generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

The terms HDR (high dynamic range) and SDR (standard dynamic range) are used in this disclosure. Those terms often convey specific values of dynamic range to those of ordinary skill in the art. However, additional embodiments are also intended in which a reference to HDR is understood to mean "higher dynamic range" and a reference to SDR is understood to mean "lower dynamic range". Such additional embodiments are not constrained by any specific values of dynamic range that might often be associated with the terms "high dynamic range" and "standard dynamic range".

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules, for example, the intra prediction, entropy coding, and/or decoding modules (160, 360, 145, 330), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example. The specific values are for example purposes and the aspects described are not limited to these specific values.

Figure 21:
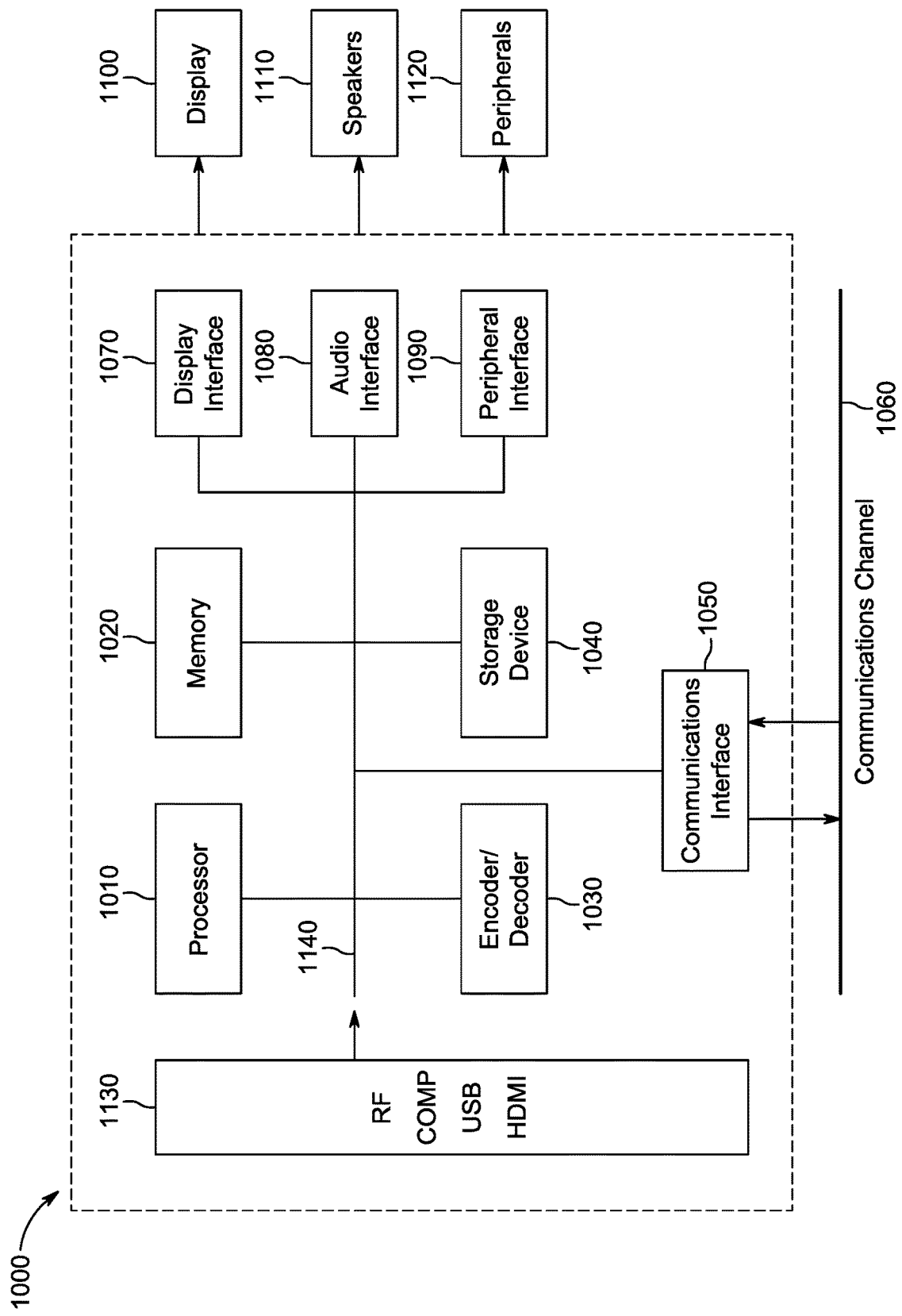
FIG. 21 provides a block diagram illustrating an example of an embodiment of apparatus in accordance with various aspects described herein.

FIG. 21 illustrates a block diagram of an example of a system in which various aspects and embodiments can be implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130.

Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing. Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Throughout this disclosure, various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting a picture from a tiled (packed) picture, determining an upsample filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Also, various implementations involve encoding. In an analogous way to the above discussion about "decoding", "encoding" as used in this application can encompass all or part of the processes performed, for example, on an input video sequence in order to produce an encoded bitstream or signal. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches can be based on an extensive testing of all encoding options, including all considered modes or coding parameters values, with a complete evaluation of their coding cost and related distortion of the reconstructed signal after coding and decoding. Faster approaches can also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various embodiments have been described. Embodiments may include any of the following features or entities, alone or in any combination, across various different claim categories and types:

Providing in the encoder and/or decoder for determining the spatiotemporal motion vector predictor of a block's motion vector based on a reduced number of spatiotemporal candidate positions being considered to construct the spatiotemporal motion vector predictor of a current block.

Providing in the encoder and/or decoder for a spatiotemporal motion vector derivation to generate some candidate motion data candidate predictor to be part of the merge candidate list used in the merge mode based on a reduced number of spatial positions being considered in the construction of the STMVP merge candidate.

Providing in the encoder and/or decoder for a merge candidate being determined or obtained from the average between at least two motion vectors taken from spatial positions around the current CU where only two spatial positions are considered, and no temporal candidate is being retrieved.

Providing in the encoder and/or decoder for a merge candidate being determined or obtained from the average between at least two motion vectors taken from spatial positions around the current CU where only two spatial positions are considered, no temporal candidate is being retrieved, and the two envisioned candidates are taken at a middle position along the top and left edges of a current PU.

Providing in the encoder and/or decoder for a merge candidate being determined or obtained from the average between two spatial candidates MV located at a middle position along the top and left edges of a current PU, and a temporal candidate MV.

Providing in the encoder and/or decoder for the temporal candidate MV being retrieved at spatial position below and on the right of current CU.

Providing in the encoder and/or decoder for a policy to decide if the proposed STMVP is available or not.

Providing in the encoder and/or decoder for an improved order in which the list of merge candidates is constructed.

Providing in the encoder and/or decoder for constructing spatiotemporal MV predictors resulting in improved coding efficiency.

Providing in the encoder and/or decoder for use of the proposed STMVP motion vector predictor in regard to the AMVP inter coding mode.

Inserting in the signaling syntax elements that enable the encoder and/or decoder to provide for a spatiotemporal motion vector derivation as described herein.

Selecting, based on these syntax elements, the spatiotemporal motion vector derivation to apply at the decoder.

A bitstream or signal that includes one or more of the described syntax elements, or variations thereof Inserting in the signaling syntax elements that enable the decoder to provide spatiotemporal motion vector derivation in a manner corresponding to that used by an encoder.

Creating and/or transmitting and/or receiving and/or decoding a bitstream or signal that includes one or more of the described syntax elements, or variations thereof A TV, set-top box, cell phone, tablet, or other electronic device that performs for a spatiotemporal motion vector derivation according to any of the embodiments described.

A TV, set-top box, cell phone, tablet, or other electronic device that performs spatiotemporal motion vector derivation according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs spatiotemporal motion vector derivation according to any of the embodiments described.

A TV, set-top box, cell phone, tablet, or other electronic device that receives (e.g. using an antenna) a signal over the air that includes an encoded image, and performs spatiotemporal motion vector derivation according to any of the embodiments described.

A computer program product storing program code that, when executed by a computer implements spatiotemporal motion vector derivation in accordance with any of the embodiments described.

A non-transitory computer readable medium including executable program instructions causing a computer executing the instructions to implement spatiotemporal motion vector derivation in accordance with any of the embodiments described.

Various other generalized, as well as particularized embodiments are also supported and contemplated throughout this disclosure.

The invention claimed is:

1. An apparatus for encoding video data, comprising:
one or more processors, wherein the one or more processors are configured to:
determine at least one motion vector is available among a first spatial motion vector associated with a first spatial location neighboring a current block to the left of the current block and a second spatial motion vector associated with a second spatial location neighboring the current block above the current block;
determine that a temporal motion vector is available, wherein the temporal motion vector is co-located with a third spatial location neighboring the current block to the right of the current block and adjacent to a bottom right corner of the current block;
obtain a spatiotemporal motion vector prediction candidate based on a combination of the temporal motion vector and the at least one motion vector that is available among the first and second spatial motion vectors; and
encode at least a portion of the video data based on the spatiotemporal motion vector prediction candidate, wherein, based on a determination that scaling is not applied to the at least one motion vector, the determination of the at least one motion vector comprises a selection of a pair of spatial motion vector predictors from a history-based motion vector predictor buffer, wherein the spatiotemporal motion vector prediction candidate is obtained based on the selected pair of spatial motion vector predictors.

2. A method for encoding video data, comprising:
determining at least one motion vector is available among a first spatial motion vector associated with a first spatial location neighboring a current block to the left of the current block and a second spatial motion vector associated with a second spatial location neighboring the current block above the current block;
determining that a temporal motion vector is available, wherein the temporal motion vector is co-located with a third spatial location neighboring the current block to the right of the current block and adjacent to a bottom right corner of the current block;
obtaining a spatiotemporal motion vector prediction candidate based on a combination of the temporal motion vector and the at least one motion vector that is available among the first and second spatial motion vectors; and
encoding at least a portion of the video data based on the spatiotemporal motion vector prediction candidate, wherein, based on a determination that scaling is not applied to the at least one motion vector, the determination of the at least one motion vector comprises a selection of a pair of spatial motion vector predictors from a history-based motion vector predictor buffer, wherein the spatiotemporal motion vector prediction candidate is obtained based on the selected pair of spatial motion vector predictors.

3. An apparatus for decoding video data, comprising:
one or more processors, wherein the one or more processors are configured to:
determine at least one motion vector is available among a first spatial motion vector associated with a first spatial location neighboring a current block to the left of the current block and a second spatial motion vector associated with a second spatial location neighboring the current block above the current block;
determine that a temporal motion vector is available, wherein the temporal motion vector is co-located with a third spatial location neighboring the current block to the right of the current block and adjacent to a bottom right corner of the current block;
obtain a spatiotemporal motion vector prediction candidate based on a combination of the temporal motion vector and the at least one motion vector that is available among the first and second spatial motion vectors; and
decode at least a portion of the video data based on the spatiotemporal motion vector prediction candidate, wherein, based on a determination that scaling is not applied to the at least one motion vector, the determination of the at least one motion vector comprises a selection of a pair of spatial motion vector predictors from a history-based motion vector predictor buffer, wherein the spatiotemporal motion vector prediction candidate is obtained based on the selected pair of spatial motion vector predictors.

4. A method for decoding video data, comprising:
determining at least one motion vector is available among a first spatial motion vector associated with a first spatial location neighboring a current block to the left of the current block and a second spatial motion vector associated with a second spatial location neighboring the current block above the current block;
determining that a temporal motion vector is available, wherein the temporal motion vector is co-located with a third spatial location neighboring the current block to the right of the current block and adjacent to a bottom right corner of the current block;
obtaining a spatiotemporal motion vector prediction candidate based on a combination of the temporal motion vector and the at least one motion vector that is available among the first and second spatial motion vectors; and
decoding at least a portion of the video data based on the spatiotemporal motion vector prediction candidate, wherein, based on a determination that scaling is not applied to the at least one motion vector, the determination of the at least one motion vector comprises a selection of a pair of spatial motion vector predictors from a history-based motion vector predictor buffer, wherein the spatiotemporal motion vector prediction candidate is obtained based on the selected pair of spatial motion vector predictors.

5. The apparatus of claim 3, wherein the one or more processors are further configured to, either apply scaling to one or more spatial motion vectors being combined, or based on a determination that scaling is not applied then the determination of the at least one motion vector comprises:
selecting the pair of spatial motion vector predictors based on respective reference picture indices, wherein the selecting comprises searching multiple neighboring spatial positions for a top and a left neighboring motion vector of the current block that satisfy a condition put onto the reference picture indices, wherein the spatiotemporal motion vector prediction candidate is obtained based on the selected pair of spatial motion vector predictors.

6. The apparatus of claim 3, wherein the one or more processors are further configured to apply scaling to one or more spatial motion vectors being averaged, or based on a determination that scaling is not applied then the determination of the at least one motion vector comprises:
  selecting a pair of spatial motion vector predictors based on respective reference picture indices that satisfy a condition put onto the reference picture indices, wherein the spatiotemporal motion vector prediction candidate is obtained based on the selected pair of spatial motion vector predictors, and wherein the condition comprises:
    a pair of spatial motion vector candidates is selected based on a condition that, in each reference picture list used by a considered spatial motion vector candidate, a reference picture index is equal to 0;
    a pair of spatial motion vector candidates is selected based on a condition that, in each reference picture list used by both spatial motion vector candidates, the reference picture indices of the two spatial candidates are equal;
    based on a condition that the reference picture indices of the two spatial candidates are equal to each other and are equal to zero, then the spatiotemporal motion vector prediction candidate is obtained based on a temporal motion vector predictor; or
    based on a condition that the reference picture indices of the two spatial candidates are equal to each other but not equal to zero, then an averaged spatiotemporal motion vector predictor is obtained based on the temporal motion vector predictor.

7. The apparatus of claim 3, wherein the or more processors are further configured to:
  determine whether to add the obtained spatiotemporal motion vector prediction candidate to a merge candidate list based on a criterion indicating a relevance of the obtained spatiotemporal motion vector prediction candidate, wherein the criterion comprises determining if an L∞ norm of a result of averaging is negligible compared to the L∞ norm of each of at least two motion vectors on which the obtaining of the spatiotemporal motion vector prediction candidate is based.

8. The apparatus of claim 7, wherein determining whether to add the obtained spatiotemporal motion vector prediction candidate to the merge candidate list comprises determining whether the obtained spatiotemporal motion vector prediction candidate is redundant to any other candidate in the merge candidate list, and adding the obtained spatiotemporal motion vector prediction candidate to the merge candidate list based on a condition that the obtained spatiotemporal motion vector prediction candidate is not redundant, wherein the determination of whether to include the obtained spatiotemporal motion vector prediction candidate in the merge candidate list is further based on a size of the merge candidate list at a time the obtained spatiotemporal motion vector prediction candidate is considered relative to a maximum allowed sized of the merge candidate list.

9. The apparatus of claim 7, wherein the obtained spatiotemporal motion vector prediction candidate is included in the merge candidate list based on an ordering of candidates included in the list, wherein an ordering comprises one of:
  placing the obtained spatiotemporal motion vector prediction candidate at a fourth position in the list;
  placing the obtained spatiotemporal motion vector prediction candidate at a position in the list determined based on a position of an alternative temporal motion vector prediction candidate;
  placing the obtained spatiotemporal motion vector prediction candidate in the list at a position providing a priority higher than all candidates in the list except for an alternative temporal motion vector prediction candidate and a left-neighboring candidate and an above-neighboring candidate;
  placing the obtained spatiotemporal motion vector prediction candidate before or after history-based motion vector prediction candidates included in the list;
  interleaving the obtained spatiotemporal motion vector prediction candidate with history-based motion vector prediction candidates included in the list; or
  interleaving the obtained spatiotemporal motion vector prediction candidate with one or more pairwise average candidates included in the list.

10. The apparatus of claim 9, wherein the combination or one or more of a plurality of combinations are obtained based on an average of available motion vectors, wherein the average of the available motion vectors comprises a weighted average of a plurality of weighted averages, each of the plurality of weighted averages being based on a respective one of a plurality of weightings.

11. A non-transitory computer readable medium storing executable program instructions to cause a computer executing the instructions to perform the method according to claim 4.

12. The apparatus of claim 3, wherein the first spatial location comprises a middle position on the left edge of the current block, and the second spatial location comprises a middle position on the top edge of the current block, and wherein the one or more processors are further configured to determine the first spatial motion vector associated with the middle position on the left edge of the current block or determine the second spatial motion vector associated with the middle position on the top edge of the current block.

13. The apparatus of claim 3, wherein the one or more processors are further configured to obtain a plurality of adaptive motion vector prediction (AMVP) candidates comprising the obtained spatiotemporal motion vector prediction candidate, wherein the video data is decoded based on an AMVP candidate from the plurality of the AMVP candidates.

14. The apparatus of claim 1, wherein the first spatial location comprises a middle position on the left edge of the current block, and the second spatial location comprises a middle position on the top edge of the current block, and wherein the one or more processors are further configured to determine the first spatial motion vector associated with the middle position on the left edge of the current block or determine the second spatial motion vector associated with the middle position on the top edge of the current block.

15. The apparatus of claim 1, wherein the one or more processors are further configured to obtain a plurality of adaptive motion vector prediction (AMVP) candidates comprising the obtained spatiotemporal motion vector prediction candidate, wherein the video data is encoded based on an AMVP candidate from the plurality of the AMVP candidates.

16. The method of claim 2, wherein the first spatial location comprises a middle position on the left edge of the current block, and the second spatial location comprises a middle position on the top edge of the current block, and wherein the method further comprises at least one of determining the first spatial motion vector associated with the middle position on the left edge of the current block or determining the second spatial motion vector associated with the middle position on the top edge of the current block.

17. The method of claim 2, further comprising obtaining a plurality of adaptive motion vector prediction (AMVP) candidates comprising the obtained spatiotemporal motion vector prediction candidate, wherein the video data is encoded based on an AMVP candidate from the plurality of the AMVP candidates.

18. The method of claim 4, wherein the first spatial location comprises a middle position on the left edge of the current block, and the second spatial location comprises a middle position on the top edge of the current block, and wherein the method further comprises at least one of determining the first spatial motion vector associated with the middle position on the left edge of the current block or determining the second spatial motion vector associated with the middle position on the top edge of the current block.

19. The method of claim 4, further comprising obtaining a plurality of adaptive motion vector prediction (AMVP) candidates comprising the obtained spatiotemporal motion vector prediction candidate, wherein the video data is decoded based on an AMVP candidate from the plurality of the AMVP candidates.

20. The method of claim 4, further comprising either applying scaling to one or more spatial motion vectors being combined, or based on a determination that scaling is not applied then the determination of the at least one motion vector comprises selecting the pair of spatial motion vector predictors based on respective reference picture indices, wherein the spatiotemporal motion vector prediction candidate is obtained based on the selected pair of spatial motion vector predictors.

* * * * *